United States Patent
Chang et al.

(10) Patent No.: US 9,269,502 B2
(45) Date of Patent: *Feb. 23, 2016

(54) CARBON MATERIALS COMPRISING ENHANCED ELECTROCHEMICAL PROPERTIES

(75) Inventors: Alan T. Chang, Renton, WA (US); Henry R. Costantino, Woodinville, WA (US); Aaron M. Feaver, Seattle, WA (US); Amalia L. Oppie, Lynnwood, WA (US); Yangyang Pan, Seattle, WA (US); Liam Cover, Seattle, WA (US); William D. Scott, Seattle, WA (US); Kirsten J. Scott, legal representative, Seattle, WA (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,975

(22) Filed: Dec. 23, 2011

(65) Prior Publication Data

US 2012/0202033 A1   Aug. 9, 2012

Related U.S. Application Data

(60) Provisional application No. 61/427,649, filed on Dec. 28, 2010.

(51) Int. Cl.
  H01G 11/34 (2013.01)
  H01G 11/24 (2013.01)
  H01G 11/44 (2013.01)

(52) U.S. Cl.
  CPC ............... *H01G 11/34* (2013.01); *H01G 11/24* (2013.01); *H01G 11/44* (2013.01); *Y02E 60/13* (2013.01); *Y02T 10/7022* (2013.01); *Y10T 428/249953* (2015.04); *Y10T 428/249978* (2015.04); *Y10T 428/249979* (2015.04)

(58) Field of Classification Search
  USPC ....... 428/315.5, 315.7; 423/445 R; 429/231.8
  See application file for complete search history.

(56) References Cited

U.S. PATENT DOCUMENTS

| | | |
|---|---|---|
| 3,518,123 A | 6/1970 | Katsoulis et al. |
| 3,619,428 A | 11/1971 | David |
| 3,876,505 A | 4/1975 | Stoneburner |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 5,260,855 A | 11/1993 | Kaschmitter et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,626,637 A | 5/1997 | Baker |
| 5,626,977 A | 5/1997 | Mayer et al. |
| 5,674,642 A | 10/1997 | Le et al. |
| 5,710,092 A | 1/1998 | Baker |
| 5,789,338 A | 8/1998 | Kaschmitter et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,072,693 A | 6/2000 | Tsushima et al. |
| 6,096,456 A | 8/2000 | Takeuchi et al. |
| 6,147,213 A | 11/2000 | Poli et al. |
| 6,153,562 A | 11/2000 | Villar et al. |
| 6,225,257 B1 | 5/2001 | Putyera et al. |
| 6,242,127 B1 | 6/2001 | Paik et al. |
| 6,309,446 B1 | 10/2001 | Nakanoya et al. |
| 6,310,762 B1 | 10/2001 | Okamura et al. |
| 6,574,092 B2 | 6/2003 | Sato et al. |
| 6,592,838 B1 | 7/2003 | Nomoto et al. |
| 6,697,249 B2 | 2/2004 | Maletin et al. |
| 6,764,667 B1 | 7/2004 | Steiner, III |

(Continued)

FOREIGN PATENT DOCUMENTS

| | | |
|---|---|---|
| CA | 2176452 A1 | 11/1997 |
| CN | 1762900 A | 4/2006 |

(Continued)

OTHER PUBLICATIONS

Abraham et al., "A Polymer Electrolyte-Based Rechargeable Lithium/Oxygen Battery," *J. Electrochem. Soc. 143*(1):1, Jan. 1996.
Alcañiz-Monge et al., "Methane Storage in Activated Carbon Fibres," *Carbon 35*(2):291-297, 1997.
Anderegg, "Grading Aggregates: II—The Application of Mathematical Formulas to Mortars," *Industrial and Engineering Chemistry 23*(9): 1058-1064, 1931.
Andreasen et al., "Ueber die Beziehung zwischen Kornabstufung and Zwischenraum in Produkten aus losen Körnern (mit einigen Experimenten)," *Kolloid-Zeitschrift 50*(3):217-228, Mar. 1930 (with translation of summary).
Babić et al., "Carbon cryogel as support of platinum nano-sized electrocatalyst for the hydrogen oxidation reaction," *Electrochemica Acta 51*:3820-3826, 2006.
Babić et al., "Characterization of carbon cryogel synthesized by sol-gel polycondensation and freeze-drying," *Carbon 42*:2617-2624, 2004.

(Continued)

*Primary Examiner* — Hai Vo
(74) *Attorney, Agent, or Firm* — Seed IP Law Group PLLC

(57) ABSTRACT

The present application is directed to carbon materials comprising an optimized pore structure. The carbon materials comprise enhanced electrochemical properties and find utility in any number of electrical devices, for example, as electrode material in ultracapacitors. Methods for making the disclosed carbon materials are also disclosed.

35 Claims, 13 Drawing Sheets

(56) References Cited

U.S. PATENT DOCUMENTS

| | | | |
|---|---|---|---|
| 6,815,105 B2 | 11/2004 | Cooper et al. | |
| 6,865,068 B1* | 3/2005 | Murakami et al. | 361/502 |
| 7,245,478 B2 | 7/2007 | Zhong et al. | |
| 7,582,902 B2 | 9/2009 | Tano et al. | |
| 7,723,262 B2 | 5/2010 | Feaver et al. | |
| 7,835,136 B2 | 11/2010 | Feaver et al. | |
| 8,158,556 B2 | 4/2012 | Feaver et al. | |
| 8,277,974 B2 | 10/2012 | Kumar et al. | |
| 8,293,818 B2 | 10/2012 | Costantino et al. | |
| 8,404,384 B2* | 3/2013 | Feaver et al. | 429/231.8 |
| 8,411,415 B2 | 4/2013 | Yoshinaga et al. | |
| 8,467,170 B2 | 6/2013 | Feaver et al. | |
| 8,480,930 B2 | 7/2013 | Suh et al. | |
| 8,580,870 B2 | 11/2013 | Costantino et al. | |
| 8,797,717 B2 | 8/2014 | Feaver et al. | |
| 2001/0002086 A1 | 5/2001 | Webb | |
| 2002/0031706 A1 | 3/2002 | Dasgupta et al. | |
| 2002/0031710 A1 | 3/2002 | Kezuka et al. | |
| 2002/0114126 A1 | 8/2002 | Hirahara et al. | |
| 2002/0168314 A1 | 11/2002 | Roemmler | |
| 2002/0172637 A1 | 11/2002 | Chesneau et al. | |
| 2003/0012722 A1 | 1/2003 | Liu | |
| 2003/0064564 A1 | 4/2003 | Lin | |
| 2003/0108785 A1 | 6/2003 | Wu et al. | |
| 2003/0170548 A1 | 9/2003 | Otsuki et al. | |
| 2004/0132845 A1 | 7/2004 | Rhine et al. | |
| 2004/0180264 A1 | 9/2004 | Honbo et al. | |
| 2005/0014643 A1* | 1/2005 | Lini et al. | 502/432 |
| 2005/0041370 A1 | 2/2005 | Wilk et al. | |
| 2005/0058589 A1 | 3/2005 | Lundquist et al. | |
| 2005/0079359 A1 | 4/2005 | Fujita et al. | |
| 2005/0135993 A1 | 6/2005 | Xu et al. | |
| 2005/0233195 A1 | 10/2005 | Arnold et al. | |
| 2005/0250011 A1 | 11/2005 | Mitchell et al. | |
| 2006/0057355 A1 | 3/2006 | Suzuki et al. | |
| 2006/0079587 A1 | 4/2006 | Albert et al. | |
| 2006/0093915 A1 | 5/2006 | Lundquist et al. | |
| 2006/0223965 A1 | 10/2006 | Trifu | |
| 2006/0240979 A1 | 10/2006 | Hirahara et al. | |
| 2007/0048605 A1 | 3/2007 | Pez et al. | |
| 2007/0113735 A1 | 5/2007 | Feaver et al. | |
| 2007/0142222 A1 | 6/2007 | Erkey et al. | |
| 2007/0166602 A1 | 7/2007 | Burchardt | |
| 2007/0292732 A1 | 12/2007 | Feaver et al. | |
| 2008/0044726 A1 | 2/2008 | Feng et al. | |
| 2008/0112876 A1 | 5/2008 | Dailey | |
| 2008/0132632 A1 | 6/2008 | Schiraldi et al. | |
| 2008/0145757 A1 | 6/2008 | Mah et al. | |
| 2008/0180881 A1 | 7/2008 | Feaver et al. | |
| 2008/0206638 A1 | 8/2008 | Takahashi et al. | |
| 2008/0241640 A1 | 10/2008 | Rajeshwar et al. | |
| 2008/0268297 A1 | 10/2008 | Quayle et al. | |
| 2008/0297981 A1 | 12/2008 | Endo et al. | |
| 2008/0299456 A1 | 12/2008 | Shiga et al. | |
| 2009/0035344 A1 | 2/2009 | Thomas et al. | |
| 2009/0053594 A1 | 2/2009 | Johnson et al. | |
| 2009/0104509 A1 | 4/2009 | Kwak et al. | |
| 2009/0104530 A1 | 4/2009 | Shizuka et al. | |
| 2009/0114544 A1 | 5/2009 | Rousseau et al. | |
| 2009/0117466 A1 | 5/2009 | Zhamu et al. | |
| 2009/0145482 A1 | 6/2009 | Mitzi et al. | |
| 2009/0185327 A1 | 7/2009 | Seymour | |
| 2009/0286160 A1 | 11/2009 | Kozono et al. | |
| 2010/0051881 A1 | 3/2010 | Ahn et al. | |
| 2010/0092370 A1 | 4/2010 | Zhang et al. | |
| 2010/0097741 A1 | 4/2010 | Zhong et al. | |
| 2010/0110613 A1 | 5/2010 | Zhong et al. | |
| 2010/0310941 A1 | 12/2010 | Kumta et al. | |
| 2010/0331179 A1 | 12/2010 | Feaver et al. | |
| 2011/0002086 A1 | 1/2011 | Feaver et al. | |
| 2011/0028599 A1 | 2/2011 | Costantino et al. | |
| 2011/0159375 A1* | 6/2011 | Feaver et al. | 429/302 |
| 2011/0199716 A1 | 8/2011 | Feaver et al. | |
| 2011/0223494 A1 | 9/2011 | Feaver et al. | |
| 2012/0081838 A1 | 4/2012 | Costantino et al. | |
| 2012/0251876 A1 | 10/2012 | Jagannathan | |
| 2012/0262127 A1* | 10/2012 | Feaver et al. | 320/167 |
| 2012/0305651 A1 | 12/2012 | Anderson et al. | |
| 2013/0004841 A1 | 1/2013 | Thompkins et al. | |
| 2013/0020349 A1 | 1/2013 | Feaver et al. | |
| 2013/0157151 A1* | 6/2013 | Feaver et al. | 429/405 |
| 2013/0169238 A1 | 7/2013 | Rojeski | |
| 2013/0252082 A1 | 9/2013 | Thompkins et al. | |
| 2013/0280601 A1 | 10/2013 | Geramita et al. | |

FOREIGN PATENT DOCUMENTS

| | | |
|---|---|---|
| CN | 101194384 A | 6/2008 |
| CN | 101604743 A | 12/2009 |
| DE | 10 210 049 249 A1 | 4/2012 |
| EP | 0 861 804 A1 | 9/1998 |
| EP | 1 049 116 A1 | 11/2000 |
| EP | 1 052 716 A2 | 11/2000 |
| EP | 1 514 859 A2 | 3/2005 |
| EP | 2 117 068 A1 | 11/2009 |
| JP | 4-59806 A | 2/1992 |
| JP | 5-320955 A | 12/1993 |
| JP | 05-320955 A | 12/1993 |
| JP | 8-112539 A | 5/1996 |
| JP | 9-275042 A | 10/1997 |
| JP | 9-328308 A | 12/1997 |
| JP | 10-297912 A | 11/1998 |
| JP | 2001-278609 A | 10/2001 |
| JP | 2002-532869 A | 10/2002 |
| JP | 2004-514637 A | 5/2004 |
| JP | 2004-203715 A | 7/2004 |
| JP | 2004-221332 A | 8/2004 |
| JP | 2004-315283 A | 11/2004 |
| JP | 2005-93984 A | 4/2005 |
| JP | 2005-136397 A | 5/2005 |
| JP | 2005-187320 A | 7/2005 |
| JP | 2006-160597 A | 6/2006 |
| JP | 2006-248848 A | 9/2006 |
| JP | 2008-7387 A | 1/2008 |
| JP | 2008-094925 A | 4/2008 |
| WO | 95/01165 A1 | 1/1995 |
| WO | 98/30496 A1 | 7/1998 |
| WO | 02/39468 A2 | 5/2002 |
| WO | 2004/087285 A1 | 10/2004 |
| WO | 2004/099073 A2 | 11/2004 |
| WO | 2004/110930 A1 | 12/2004 |
| WO | 2005/043653 A1 | 5/2005 |
| WO | 2007/061761 A1 | 5/2007 |
| WO | 2008/113133 A1 | 9/2008 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/071916 A1 | 6/2012 |

OTHER PUBLICATIONS

Babič et al., "Characterization of carbon cryogels synthesized by sol-gel polycondensation," *J. Serb. Chem. Soc.* 70(1):21-31, 2005.

Barbieri et al., "Capacitance limits of high surface area activated carbons for double layer capacitors," *Carbon* 43:1303-1310, 2005.

Barton et al., "Tailored Porous Materials," *Chem. Mater.* 11:2633-2656, 1999.

Beattie et al., "High-Capacity Lithium-Air Cathodes," *J. Electrochem. Soc.* 156(1):A44-A47, 2009.

Besenhard, "Handbook of battery materials," *Weinheim, Wiley—VCH, Weinheim*, New York, 389-401, Dec. 31, 1999.

Bock et al., "Structural Investigation of Resorcinol Formaldehyde and Carbon Aerogels Using SAXS and BET, " *Journal of Porous Materials* 4:287-294, 1997.

Buiel, et al., "Li-insertion in hard carbon anode materials for Li-ion batteries," *Electrochimica Acta* 45:121-130, 1999.

Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.

(56) References Cited

OTHER PUBLICATIONS

Butler et al., "Braking Performance Test Procedure for the Hybrid Vehicle Energy Storage Systems: Capacitor Test Results," *Joint International Meeting of the Electrochemical Society, Abstract 684*, Honolulu, HI, Oct. 3-8, 2004, 5 pages.
Chmiola et al., "Anomalous Increase in Carbon Capacitance at Pore Sizes Less Than 1 Nanometer," *Science* 313:1760-1763, Sep. 22, 2006.
Conway et al., "Partial Molal Volumes of Tetraalkylammonium Halides and Assignment of Individual Ionic Contributions," *Trans. Faraday Soc.* 62:2738-2749, 1966.
Czakkel et al., "Influence of drying on the morphology of resorcinol-formaldehyde-based carbon gels," *Microporous and Mesoporous Materials* 86:124-133, 2005.
Débart et al., "$\alpha$-$MnO_2$ Nanowires: A Catalyst for the $O_2$ Electrode in Rechargeable Lithium Batteries," *Agnew. Chem. Int. Ed.* 47:4521-4524, 2008.
Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Furnas, "Grading Aggregates I—Mathematical Relations for Beds of Broken Solids of Maximum Density," *Industrial and Engineering Chemistry* 23(9): 1052-1058, 1931.
Gouérec et al., "Preparation and Modification of Polyacrylonitrile Microcellular Foam Films for Use as Electrodes in Supercapacitors," *Journal of the Electrochemical Society* 148(1):A94-A101, 2001.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299308, 2004.
Inomata et al., "Natural gas storage in activated carbon pellets without a binder," *Carbon* 40:87-93, 2002.
International Preliminary Report of Patentability for International Application No. PCT/US/2010/030396, mailed Jul. 18, 2013, 16 pages.
International Preliminary Report of Patentability for International Application No. PCT/US2006/044524, mailed May 27, 2008, 7 pages.
International Preliminary Report of Patentability for International Application No. PCT/US2007/084886, mailed May 19, 2009, 7 pages.
International Search Report and Written Opinion for International Application No. PCT/US2006/044524, mailed Apr. 11, 2007, 8 pages.
International Search Report and Written Opinion for International Application No. PCT/US2007/84886, mailed Jun. 11, 2008, 11 pages.
International Search Report and Written Opinion for International Application No. PCT/US2010/40836, mailed Sep. 8, 2010, 12 pages.
International Search Report and Written Opinion for International Application No. PCT/US2010/059947, mailed Mar. 2, 2011, 14 pages.
Job et al., "Carbon aerogels, cryogels and xerogels: Influence of the drying method on the textural properties of porous carbon materials," *Carbon* 43:2481-2494, 2005.
Khomenko et al., "High-voltage asymmetric supercapacitors operating in aqueous electrolyte," *Appl. Phys. A* 82:567-573, 2006.
Kocklenberg et al., "Texture control of freeze-dried resorcinol-formaldehyde gels," *Journal of Non-Crystalline Solids* 225:8-13, 1998.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Influence of pore structure and surface chemistry on electric double layer capacitance in non-aqueous electrolyte," *Carbon* 41:1765-1775, 2003.
Lozano-Castelló et al., "Powdered Activated Carbons and Activated Carbon Fibers for Methane Storage: A Comparative Study," *Energy & Fuels* 16:1321-1328, 2002.
McEwen et al., "Nonequeous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status of Present Commercial Devices," Proceedings of the $8^{th}$ International Seminar on Double Layer Capacitors and Similar Energy Storage Devices, Deerfield Beach, Florida, Dec. 7-9, 1998, 9 pages.
Nishihara et al., "Preparation of resorcinol—formaldehyde carbon cryogel microhoneycombs," *Carbon* 42:899-901, 2004.
Ogasawara et al., "Rechargeable $LI_2O_2$ Electrode for Lithium Batteries," *Journal American Chemical Society* 128(4):1390-1393, 2006.
Pääkkö, "Long and entangled native cellulose I nanofibers allow flexible aerogels and hierarchically porous templates for functionalities," *Soft Matter* 4:2492-2499, 2008.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.
Read, J., "Ether-Based Electrolytes for the Lithium/Oxygen Organic Electrolyte Battery," *J. Electrochem. Soc.* 153(1):A96-A100, 2006.
Read et al., "Oxygen Transport Properties of Organic Electrolytes and Performance of Lithium/Oxygen Battery," *J. Electrochem. Soc.* 150(10):A1351-A1356, 2003.
Read, J., "Characterization of the Lithium/Oxygen Organic Electrolyte Battery," *J. Electrochemical Soc.* 149(9):A1190-A1195, 2002.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between a High Resolution $\alpha_s$-Plot and the Pore Size Distribution for Activated Carbon," *Carbon* 36(10):1459-1467, 1998.

(56) References Cited

OTHER PUBLICATIONS

Simon et al., "Materials for electrochemical capacitors," *Nature Materials* 7:845-854, Nov. 2008.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso, "Isotropic Graphite Engineering Data," *Toyo Tanso Co., Ltd.* Catalog published 1994.
Toyo Tanso, "Isotropic Graphite Technical Data," *Toyo Tanso Co., Ltd.* Catalog published 1994.
Toyo Tanso, "Graphite Applications," *Toyo Tanso Co., Ltd.* Catalog published 1998. (Machine Translation attached).
Toyo Tanso Carbon Products, "Special Graphite and Compound Material Products," *Toyo Tanso Co., Ltd.* Catalog published 2008.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xie et al., "Pore size control of Pitch-based activated carbon fibers by pyrolytic deposition of propylene," *Applied Surface Science* 250:152-160, 2005.
Xu et al., "Optimization of Nonaqueous Electrolytes for Primary Lithium/Air Batteries Operated in Ambient Environment," *Journal of the Electrochemical Society* 156(10):A773-A779, 2009.
Yamamoto et al., "Control of mesoporosity of carbon gels prepared by sol-gel polycondensation and freeze drying," *Journal of Non-Crystalline Solids* 288:46-55, 2001.
Yamamoto et al., "Porous properties of carbon gel microspheres as adsorbents for gas separation," *Carbon* 42:1671-1676, 2004.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte $Li/O_2$ battery," *Journal of Power Sources* 195:1235-1240, 2010.
Feaver et al., "Electric Double Layer Capacitance Device," U.S. Appl. No. 14/448,853, filed Jul. 31, 2014, 75 pages.
Feaver et al., "Mesoporous Carbon Materials Comprising Bifunctional Catalysts," U.S. Appl. No. 14/543,587, filed Nov. 17, 2014, 102 pages.
Constantino et al., "Carbon-Based Compositions With Highly Efficient Volumetric Gas Sorption," U.S. Appl. No. 14/533,956, filed Nov. 5, 2014, 90 pages.
Job et al., "Highly dispersed platinum catalysts prepared by impregnation of texture-tailored carbon xerogels," Journal of Catalysis 240:160-171, 2006.
Job et al., "Synthesis of transition metal-doped carbon xerogels by solubilization of metal salts in resorcinol-formaldehyde aqueous solution," Carbon 42:3217-3227, 2004.
Kim et al., "Adsorption of phenol and reactive dyes from aqueous solution on carbon cryogel microspheres with controlled porous structure," Microporous and Mesoporous Materials 96:191196, 2006.
WebElements, "Lead: the essentials," attached as a PDF showing the webpage availability date as of Aug. 14, 2009 (via the Wayback Machine), web URL is http://www.webelements.com/lead/, pp. 1-3.

\* cited by examiner

CARBON MATERIALS COMPRISING ENHANCED ELECTROCHEMICAL PROPERTIES

CROSS-REFERENCE TO RELATED APPLICATION

The present application claims the benefit under 35 U.S.C. §119(e) of U.S. Provisional Patent Application No. 61/427,649 filed on Dec. 28, 2010; which application is incorporated herein by reference in its entirety.

STATEMENT OF GOVERNMENT INTEREST

This invention was made in part with government support under Small Business Innovation Research (SBIR) Grant No. W15P7T-09-C-5311. The United States Government may have certain rights in this invention.

BACKGROUND

1. Technical Field

The present invention generally relates to carbon materials comprising an optimized pore structure, methods for making the same and devices containing the same.

2. Description of the Related Art

Activated carbon is commonly employed in electrical storage and distribution devices. The high surface area, conductivity and porosity of activated carbon allows for the design of electrical devices having higher energy density than devices employing other materials. Electric double-layer capacitors (EDLCs or "ultracapacitors") are an example of such devices. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other hand-held electronic devices. EDLCs are also commonly use in electric vehicles such as electric cars, trains, buses and the like.

Batteries are another common energy storage and distribution device which often contain an activated carbon material (e.g., as anode material, current collector, or conductivity enhancer). For example, lithium/carbon batteries having a carbonaceous anode intercalated with lithium represent a promising energy storage device. Other types of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

One known limitation of EDLCs and carbon-based batteries is decreased performance at high-temperature, high voltage operation, repeated charge/discharge cycles and/or upon aging. This decreased performance has been attributed, at least in part, to electrolyte impurity or impurities in the carbon electrode itself, causing breakdown of the electrode at the electrolyte/electrode interface. Thus, it has been suggested that EDLCs and/or batteries comprising electrodes prepared from higher purity carbon materials could be operated at higher voltages and for longer periods of time at higher temperatures than existing devices.

In addition to purity, another known limitation of carbon-containing electrical devices is the pore structure of the activated carbon itself. While activated carbon materials typically comprise high porosity, the pore size distribution is not optimized for use in electrical energy storage and distribution devices. Such optimization includes an idealized blend of both micropores and mesopores. An idealized pore size distribution is expected to maximize ion mobility (i.e., lower resistance), increase power density and improve volumetric capacitance of electrodes prepared from the optimized carbon materials.

Although the need for improved high purity carbon materials comprising a pore structure optimized for high pulse power electrochemical applications has been recognized, such carbon materials are not commercially available and no reported preparation method is capable of yielding the same. One common method for producing high surface area activated carbon materials is to pyrolyze an existing carbon-containing material (e.g., coconut fibers or tire rubber). This results in a char with relatively low surface area which can subsequently be over-activated to produce a material with the surface area and porosity necessary for the desired application. Such an approach is inherently limited by the existing structure of the precursor material, and typically results in a carbon material having an unoptimized pore structure and an ash content (e.g., metal impurities) of 1% or higher.

Activated carbon materials can also be prepared by chemical activation. For example, treatment of a carbon-containing material with an acid, base or salt (e.g., phosphoric acid, potassium hydroxide, sodium hydroxide, zinc chloride, etc.) followed by heating results in an activated carbon material. However, such chemical activation also produces an activated carbon material not suitable for use in high performance electrical devices.

Another approach for producing high surface area activated carbon materials is to prepare a synthetic polymer from carbon-containing organic building blocks (e.g., a polymer gel). As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step. However, known methods for preparing carbon materials from synthetic polymers produce carbon materials having unoptimized pore structures and unsuitable levels of impurities. Accordingly, electrodes prepared from these materials demonstrate unsuitable electrochemical properties.

While significant advances have been made in the field, there continues to be a need in the art for improved high purity carbon materials comprising an optimized pore structure for use in electrical energy storage devices, as well as for methods of making the same and devices containing the same. The present invention fulfills these needs and provides further related advantages.

BRIEF SUMMARY

In general terms, the current invention is directed to novel carbon materials comprising an optimized pore structure. The optimized pore structure comprises a ratio of micropores to mesopores which increases the power density and provides for high ion mobility in electrodes prepared from the disclosed carbon materials. In addition, electrodes prepared from the disclosed carbon materials comprise low ionic resistance and high frequency response. The electrodes thus comprise a higher power density and increased volumetric capacitance compared to electrodes prepared from other carbon materials. The high purity of the carbon materials also contributes to improving the operation, life span and performance of any number of electrical storage and/or distribution devices Accordingly, the novel carbon materials find utility in any number of electrical energy storage devices, for example as electrode material in ultracapacitors. Such devices containing the disclosed carbon materials are useful in any number of applications, including applications requiring high pulse power. Because of the unique properties of the disclosed carbon materials, the devices are also expected to have higher durability, and thus an increased life span, compared to other known carbon-containing electrochemical devices.

Accordingly, one embodiment of the present disclosure is directed to a carbon material comprising a pore structure, the pore structure comprising micropores, mesopores and a total pore volume, wherein from 40% to 90% of the total pore volume resides in micropores, from 10% to 60% of the total pore volume resides in mesopores and less than 10% of the total pore volume resides in pores greater than 20 nm.

In other embodiments, from 40% to 50% of the total pore volume resides in micropores and from 50% to 60% of the total pore volume resides in mesopores. For example, in some embodiments, from 43% to 47% of the total pore volume resides in micropores and from 53% to 57% of the total pore volume resides in mesopores. For example, in a specific embodiment, about 45% of the total pore volume resides in micropores and about 55% of the total pore volume resides in mesopores. In another embodiment, less than 5% of the total pore volume resides in pores greater than 20 nm.

In still other embodiments, from 40% to 85% of the total pore volume of the carbon materials resides in micropores and from 15% to 40% of the total pore volume resides in mesopores. For example, in some embodiments from 75% to 85% of the total pore volume resides in micropores and from 15% to 25% of the total pore volume resides in mesopores. In other embodiments from 65% to 75% of the total pore volume resides in micropores and from 20% to 30% of the total pore volume resides in mesopores. In some specific embodiments, about 80% of the total pore volume resides in micropores and about 20% of the total pore volume resides in mesopores. In other specific embodiments, about 70% of the total pore volume resides in micropores and about 30% of the total pore volume resides in mesopores.

In other embodiments, the disclosure provides a carbon material comprising a pore structure, the pore structure comprising micropores, mesopores and a total pore volume, wherein from 20% to 50% of the total pore volume resides in micropores, from 50% to 80% of the total pore volume resides in mesopores and less than 10% of the total pore volume resides in pores greater than 20 nm.

In some embodiments, from 20% to 40% of the total pore volume resides in micropores and from 60% to 80% of the total pore volume resides in mesopores. In other embodiments, from 25% to 35% of the total pore volume resides in micropores and from 65% to 75% of the total pore volume resides in mesopores. For example, in some embodiments about 30% of the total pore volume resides in micropores and about 70% of the total pore volume resides in mesopores.

In still other embodiments of the foregoing carbon material, from 30% to 50% of the total pore volume resides in micropores and from 50% to 70% of the total pore volume resides in mesopores. In other embodiments, from 35% to 45% of the total pore volume resides in micropores and from 55% to 65% of the total pore volume resides in mesopores. For example, in some embodiments, about 40% of the total pore volume resides in micropores and about 60% of the total pore volume resides in mesopores.

In certain variations of any of the above embodiments, less than 5% of the total pore volume resides in pores greater than 20 nm.

In other variations, the carbon material comprises a total impurity content of less than 500 ppm of elements having atomic numbers ranging from 11 to 92 as measured by proton induced x-ray emission. For example, the carbon material may comprise a total impurity content of less than 200 ppm, less than 100 ppm or even less than 50 of elements having atomic numbers ranging from 11 to 92 as measured by proton induced x-ray emission.

In other embodiments, the ash content of the carbon material is less than 0.03% as calculated from proton induced x-ray emission data, for example, less than 0.01% or even less than 0.001% as calculated from proton induced x-ray emission data.

In some embodiments, the carbon material comprises at least 95% carbon by weight as measured by combustion analysis and proton induced x-ray emission.

In yet other embodiments, the carbon material comprises less than 10 ppm iron as measured by proton induced x-ray emission, the carbon material comprises less than 3 ppm nickel as measured by proton induced x-ray emission, the carbon material comprises less than 30 ppm sulfur as measured by proton induced x-ray emission, the carbon material comprises less than 1 ppm chromium as measured by proton induced x-ray emission, the carbon material comprises less than 1 ppm copper as measured by proton induced x-ray emission or the carbon material comprises less than 1 ppm zinc as measured by proton induced x-ray emission.

In some certain embodiments, the carbon material comprises less than 100 ppm sodium, less than 100 ppm silicon, less than 10 ppm sulfur, less than 25 ppm calcium, less than 10 ppm iron, less than 2 ppm nickel, less than 1 ppm copper, less than 1 ppm chromium, less than 50 ppm magnesium, less than 10 ppm aluminum, less than 25 ppm phosphorous, less than 5 ppm chlorine, less than 25 ppm potassium, less than 2 ppm titanium, less than 2 ppm manganese, less than 0.5 ppm cobalt and less than 5 ppm zinc as measured by proton induced x-ray emission, and wherein all other elements having atomic numbers ranging from 11 to 92 are undetected by proton induced x-ray emission.

In other embodiments, the carbon material comprises less than 50 ppm sodium, less than 50 ppm silicon, less than 30 ppm sulfur, less than 10 ppm calcium, less than 10 ppm iron, less than 1 ppm nickel, less than 1 ppm copper, less than 1 ppm chromium and less than 1 ppm zinc as measured by proton induced x-ray emission.

In some embodiments, the carbon material comprises less than 3.0% oxygen, less than 0.1% nitrogen and less than 0.5% hydrogen as determined by combustion analysis. For example, in further embodiments, the carbon material comprises less than 1.0% oxygen as determined by combustion analysis.

In other embodiments, the carbon material comprises a pyrolyzed polymer cryogel or the carbon material comprises an activated polymer cryogel.

In some specific embodiments, the carbon material comprises a BET specific surface area of at least 500 $m^2/g$, at least 1500 $m^2/g$ or at least 2000 $m^2/g$.

In other embodiments, the carbon material comprises a pore volume of at least 0.60 cc/g or a pore volume of at least 1.00 cc/g. In other embodiments, the carbon material comprises a pore volume of at least 1.50 cc/g or a pore volume of at least 2.00 cc/g.

In yet other embodiments, the present disclosure provides an electrode comprising a carbon material comprising a pore structure, the pore structure comprising micropores, mesopores and a total pore volume, wherein from 40% to 90% of the total pore volume resides in micropores, from 10% to 60% of the total pore volume resides in mesopores and less than 10% of the total pore volume resides in pores greater than 20 nm.

In certain embodiments of the disclosed electrode, the carbon material comprises a total impurity content of less than 500 ppm of elements having atomic numbers ranging from 11 to 92 as measured by proton induced x-ray emission.

In still other embodiments, the present disclosure provides a device comprising a carbon material comprising a pore structure, the pore structure comprising micropores, mesopores and a total pore volume, wherein from 40% to 90% of the total pore volume resides in micropores, from 10% to 60% of the total pore volume resides in mesopores and less than 10% of the total pore volume resides in pores greater than 20 nm.

In some embodiments, the device is an electric double layer capacitor EDLC. In other embodiments, the device is a battery, for example a lithium/carbon battery, zinc/carbon, lithium air battery or lead acid battery. For example, in some embodiments the device is a lead/acid battery comprising:

a) at least one positive electrode comprising a first active material in electrical contact with a first current collector;

b) at least one negative electrode comprising a second active material in electrical contact with a second current collector; and c) an electrolyte;

wherein the positive electrode and the negative electrode are separated by an inert porous separator, and wherein at least one of the first or second active materials comprises the carbon material.

In other certain embodiments, the device is an electric double layer capacitor (EDLC) device comprising:

a) a positive electrode and a negative electrode wherein each of the positive and the negative electrodes comprise the carbon material;

b) an inert porous separator; and c) an electrolyte;

wherein the positive electrode and the negative electrode are separated by the inert porous separator.

In some aspects, the EDLC device comprises a gravimetric power of at least 10 W/g, a volumetric power of at least 5 W/cc, a gravimetric capacitance of at least 100 F/g or a volumetric capacitance of at least 10.0 F/cc.

In other embodiments, the EDLC device comprises a gravimetric capacitance of at least of at least 110 F/g as measured by constant current discharge from 2.7 V to 0.1 V with a 5 second time constant employing a 1.8 M solution of tetraethylammonium-tetrafluororoborate in acetonitrile electrolyte and a current density of 0.5 A/g. In still other embodiments, the EDLC device comprises a volumetric capacitance of at least of at least 15 F/cc as measured by constant current discharge from 2.7 V to 0.1 V with a 5 second time constant employing a 1.8 M solution of tetraethylammonium-tetrafluororoborate in acetonitrile electrolyte and a current density of 0.5 A/g.

In still other embodiments of the foregoing EDLC device, the EDLC device comprises a gravimetric capacitance of at least 13 F/cc as measured by constant current discharge from 2.7 V to 0.1 V and with at least 0.24 Hz frequency response and employing a 1.8 M solution of tetraethylammonium-tetrafluoroborate in acetonitrile electrolyte and a current density of 0.5 A/g. In some other embodiments, the EDLC device comprises a gravimetric capacitance of at least 17 F/cc as measured by constant current discharge from 2.7 V to 0.1 V and with at least 0.24 Hz frequency response and employing a 1.8 M solution of tetraethylammonium-tetrafluororoborate in acetonitrile electrolyte and a current density of 0.5 A/g.

In some embodiments of any of the foregoing devices, from 43% to 47% of the total pore volume resides in micropores and from 53% to 57% of the total pore volume resides in mesopores, and in other embodiments from 83% to 77% of the total pore volume resides in micropores and from 17% to 23% of the total pore volume resides in mesopores.

In another variation of any of the foregoing devices, the carbon material comprises a total impurity content of less than 500 ppm or less than 200 ppm, less than 100 ppm or even less than 50 ppm of elements having atomic numbers ranging from 11 to 92 as measured by proton induced x-ray emission.

In other certain other embodiments of the foregoing devices, the ash content of the carbon material is less than 0.03%, for example less than 0.01% or even less than 0.001% as calculated from proton induced x-ray emission data, while in other embodiments the carbon material comprises at least 95% carbon as measured by combustion analysis and proton induced x-ray emission.

In some specific embodiments of the foregoing devices, the carbon material comprises less than 10 ppm iron as measured by proton induced x-ray emission, less than 3 ppm nickel as measured by proton induced x-ray emission, less than 30 ppm sulfur as measured by proton induced x-ray emission, less than 1 ppm chromium as measured by proton induced x-ray emission, less than 1 ppm copper as measured by proton induced x-ray or less than 1 ppm zinc as measured by proton induced x-ray emission. In other embodiments, less than 5% of the total pore volume resides in pores greater than 20 nm.

In other embodiments of the foregoing devices, the carbon material comprises an activated polymer cryogel. Other embodiments in include variations wherein the carbon material comprises a BET specific surface area of at least 500 $m^2/g$, at least 1500 $m^2/g$ or at least 2000 $m^2/g$.

In yet another embodiment, the present disclosure provides a method for making a carbon material comprising a pore structure, the pore structure comprising micropores, mesopores and a total pore volume, wherein from 40% to 90% of the total pore volume resides in micropores, from 10% to 60% of the total pore volume resides in mesopores and less than 10% of the total pore volume resides in pores greater than 20 nm., wherein the method comprises reacting one or more polymer precursors under acidic conditions in the presence of a volatile basic catalyst to obtain a polymer gel.

In certain embodiments of the foregoing method, from 43% to 47% of the total pore volume resides in micropores and from 53% to 57% of the total pore volume resides in mesopores, and in other embodiments, from 83% to 77% of the total pore volume resides in micropores and from 17% to 23% of the total pore volume resides in mesopores.

The disclosed method may also further comprise admixing the one or more polymer precursors in a solvent comprising acetic acid and water. Other variations include embodiments wherein the volatile basic catalyst comprises ammonium carbonate, ammonium bicarbonate, ammonium acetate, ammonium hydroxide, or combinations thereof. In another embodiment, the one or more polymer precursors comprise resorcinol and formaldehyde.

In some other further embodiments, the method further comprises:

(a) freeze drying the polymer gel to obtain a polymer cryogel;

(b) pyrolyzing the polymer cryogel to obtain a pyrolyzed cryogel; and (c) activating the pyrolyzed cryogel to obtain activated carbon material.

These and other aspects of the invention will be apparent upon reference to the following detailed description.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
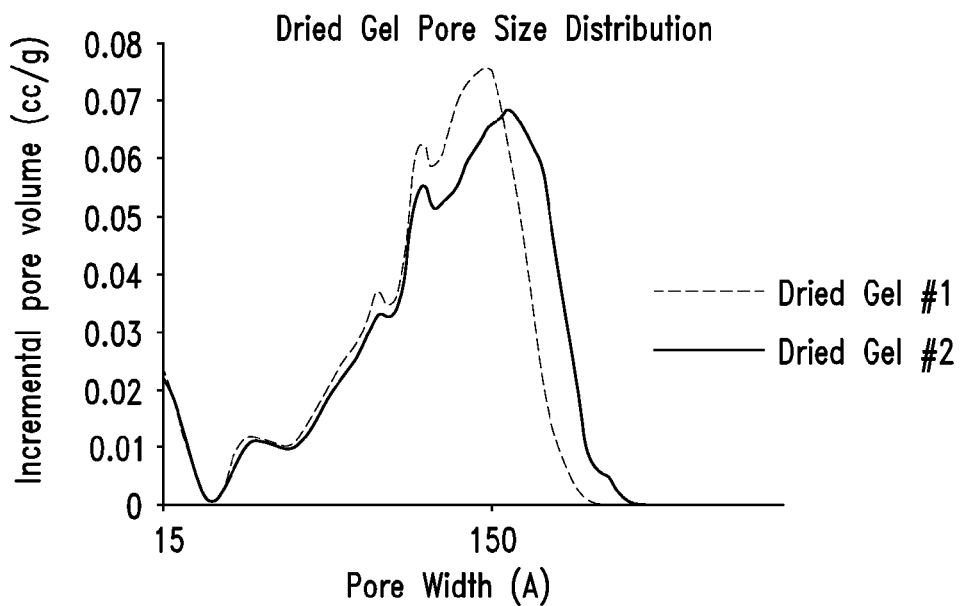
FIG. 1 shows pore size distribution of two different batches of dried polymer gel.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Carbon material" refers to a material or substance comprised substantially of carbon. Carbon materials include ultrapure as well as amorphous and crystalline carbon materials. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to an undesired foreign substance (e.g., a chemical element) within a material which differs from the chemical composition of the base material. For example, an impurity in a carbon material refers to any element or combination of elements, other than carbon, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ultrapure" refers to a substance having a total PIXE impurity content of less than 0.050%. For example, an "ultrapure carbon material" is a carbon material having a total PIXE impurity content of less than 0.050% (i.e., 500 ppm).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of two or more structural repeating units.

"Synthetic polymer precursor material" or "polymer precursor" refers to compounds used in the preparation of a synthetic polymer. Examples of polymer precursors that can be used in certain embodiments of the preparations disclosed herein include, but are not limited to, aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel (e.g., an ultrapure polymer gel) as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying wherein the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of an activated carbon material comprises micropores and mesopores. For example, in certain embodiments the ratio of micropores to mesopores is optimized for enhanced electrochemical performance.

"Mesopore" generally refers to a pore having a diameter ranging from 2 nanometers to 50 nanometers while the term "micropore" refers to a pore having a diameter less than 2 nanometers.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to the positive or negative component of a cell (e.g., capacitor, battery, etc.) including the active material. Electrodes generally comprise one or more metal leads through which electricity enters or leaves the electrode.

"Binder" refers to a material capable of holding individual particles of a substance (e.g., a carbon material) together such that after mixing a binder and the particles together the resulting mixture can be formed into sheets, pellets, disks or other shapes. In certain embodiments, an electrode may comprise the disclosed carbon materials and a binder. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

A. Carbon Materials Comprising Optimized Pore Size Distributions

As noted above, one embodiment of the present disclosure is a carbon material comprising an optimized pore size distribution. The optimized pore size distribution contributes to the superior performance of electrical devices comprising the carbon materials relative to devices comprising other known carbon materials. For example, in some embodiments, the carbon material comprises an optimized blend of both micropores and mesopores and may also comprise low surface functionality upon pryolysis and/or activation. In other embodiments, the carbon material comprises a total of less than 500 ppm of all elements having atomic numbers ranging from 11 to 92, as measured by proton induced x-ray emission. The high purity and optimized micropore/mesopore distribution make the carbon materials ideal for use in electrical storage and distribution devices, for example ultracapacitors.

The optimized pore size distributions, as well as the high purity, of the disclosed carbon materials can be attributed to the disclosed sol gel methods and subsequent post-polymerization processing of the polymer gels (e.g., pyrolysis and/or activation). Applicants have discovered that when one or more polymer precursors, for example a phenolic compound and an aldehyde, are co-polymerized under acidic conditions in the presence of a volatile basic catalyst, an ultrapure polymer gel results. This is in contrast to other reported methods for the preparation of polymer gels which result in polymer gels comprising residual levels of undesired impurities. Pyrolysis and/or activation of the ultrapure polymer gels under the disclosed conditions results in an ultrapure carbon material having an optimized pore size distribution.

The properties of the disclosed carbon materials, as well as methods for their preparation are discussed in more detail below.

1. Polymer Gels

Polymer gels are intermediates in the preparation of the disclosed carbon materials. As such, the physical and chemical properties of the polymer gels contribute to the properties of the carbon materials.

In other embodiments, the polymer gel comprises a total of less than 500 ppm of all other elements (i.e., excluding the electrochemical modifier) having atomic numbers ranging from 11 to 92. For example, in some other embodiments the polymer gel comprises less than 200 ppm, less than 100 ppm, less than 50 ppm, less than 25 ppm, less than 10 ppm, less than 5 ppm or less than 1 ppm of all other elements having atomic numbers ranging from 11 to 92. In some embodiments, the electrochemical modifier content and impurity content of the polymer gels can be determined by proton induced x-ray emission (PIXE) analysis.

In some embodiments, the polymer gel is a dried polymer gel, for example, a polymer cryogel. In other embodiments, the dried polymer gel is a polymer xerogel or a polymer aerogel. In some embodiments, the polymer gels are prepared from phenolic compounds and aldehyde compounds, for example, in one embodiment, the polymer gels can be produced from resorcinol and formaldehyde. In other embodiments, the polymer gels are produced under acidic conditions, and in other embodiments the polymer gels are produced in the presence of the electrochemical modifier. In some embodiments, acidity can be provided by dissolution of a solid acid compound, by employing an acid as the reaction solvent or by employing a mixed solvent system where one of the solvents is an acid. Preparation of the polymer gels is described in more detail below.

The disclosed process comprises polymerization to form a polymer gel in the presence of a basic volatile catalyst. Accordingly, in some embodiments, the polymer gel comprises one or more salts, for example, in some embodiments the one or more salts are basic volatile salts. Examples of basic volatile salts include, but are not limited to, ammonium carbonate, ammonium bicarbonate, ammonium acetate, ammonium hydroxide, and combinations thereof. Accordingly, in some embodiments, the present disclosure provides a polymer gel comprising ammonium carbonate, ammonium bicarbonate, ammonium acetate, ammonium hydroxide, or combinations thereof. In further embodiments, the polymer gel comprises ammonium carbonate. In other further embodiments, the polymer gel comprises ammonium acetate.

The polymer gels may also comprise low ash content which may contribute to the low ash content of a carbon material prepared therefrom. Thus, in some embodiments, the ash content of the polymer gel ranges from 0.1% to 0.001%. In other embodiments, the ash content of the polymer gel is less than 0.1%, less than 0.08%, less than 0.05%, less than 0.03%, less than 0.025%, less than 0.01%, less than 0.0075%, less than 0.005% or less than 0.001%.

In other embodiments, the polymer gel has a total PIXE impurity content of all other elements of less than 500 ppm and an ash content of less than 0.08%. In a further embodiment, the polymer gel has a total PIXE impurity content of all other elements of less than 300 ppm and an ash content of less than 0.05%. In another further embodiment, the polymer gel has a total PIXE impurity content of all other elements of less than 200 ppm and an ash content of less than 0.02%. In another further embodiment, the polymer gel has a total PIXE impurity content of all other elements of less than 200 ppm and an ash content of less than 0.01%.

As noted above, polymer gels comprising impurities generally yield carbon materials which also comprise impurities. Accordingly, one aspect of the present disclosure is a polymer gel with low levels of residual undesired impurities. The amount of individual PIXE impurities present in the polymer gel can be determined by proton induced x-ray emission. In some embodiments, the level of sodium present in the polymer gel is less than 1000 ppm, less than 500 ppm, less than 100 ppm, less than 50 ppm, less than 10 ppm, or less than 1 ppm. In some embodiments, the level of magnesium present in the polymer gel is less than 1000 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some specific embodiments, the polymer gel comprises less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium and less than 5 ppm zinc. In other specific embodiments, the polymer gel comprises less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc.

In other specific embodiments, the polymer gel comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the polymer gel comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed method yields a polymer gel comprising a high specific surface area. Without being bound by theory, it is believed that the surface area of the polymer gel contributes, at least in part, to the desirable surface area properties of the carbon materials. The surface area can be measured using the BET technique well-known to those of skill in the art. In one embodiment of any of the aspects disclosed herein the polymer gel comprises a BET specific surface area of at least 150 $m^2/g$, at least 250 $m^2/g$, at least 400 $m^2/g$, at least 500 $m^2/g$, at least 600 $m^2/g$ or at least 700 $m^2/g$.

In one embodiment, the polymer gel comprises a BET specific surface area of 100 $m^2/g$ to 1000 $m^2/g$. Alternatively, the polymer gel comprises a BET specific surface area of between 150 $m^2/g$ and 900 $m^2/g$. Alternatively, the polymer gel comprises a BET specific surface area of between 400 $m^2/g$ and 800 $m^2/g$.

In one embodiment, the polymer gel comprises a tap density of from 0.10 g/cc to 0.60 g/cc. In one embodiment, the polymer gel comprises a tap density of from 0.15 g/cc to 0.25 g/cc. In one embodiment of the present disclosure, the polymer gel comprises a BET specific surface area of at least 150 $m^2/g$ and a tap density of less than 0.60 g/cc. Alternately, the polymer gel comprises a BET specific surface area of at least 250 $m^2/g$ and a tap density of less than 0.4 g/cc. In another embodiment, the polymer gel comprises a BET specific surface area of at least 500 $m^2/g$ and a tap density of less than 0.30 g/cc.

In another embodiment of any of the aspects or variations disclosed herein the polymer gel comprises a residual water content of less than 15%, less than 13%, less than 10%, less than 5% or less than 1%.

In one embodiment, the polymer gel comprises a fractional pore volume of pores at or below 500 angstroms that comprises at least 25% of the total pore volume, 50% of the total pore volume, at least 75% of the total pore volume, at least 90% of the total pore volume or at least 99% of the total pore volume. In another embodiment, the polymer gel comprises a fractional pore volume of pores at or below 20 nm that comprises at least 50% of the total pore volume, at least 75% of the total pore volume, at least 90% of the total pore volume or at least 99% of the total pore volume.

In some embodiments, the amount of nitrogen adsorbed per mass of polymer gel at 0.11 relative pressure is at least 10% of the total nitrogen adsorbed up to 0.99 relative pressure or at least 20% of the total nitrogen adsorbed up to 0.99 relative pressure. In another embodiment, the amount of nitrogen adsorbed per mass of polymer gel at 0.11 relative pressure is between 10% and 50% of the total nitrogen adsorbed up to 0.99 relative pressure, is between 20% and 40% of the total nitrogen adsorbed up to 0.99 relative pressure or is between 20% and 30% of the total nitrogen adsorbed up to 0.99 relative pressure.

In one embodiment, the polymer gel comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the polymer gel comprises a fractional pore surface area of pores at or below 20 nm that comprises at least 50% of the total pore surface area, at least 75% of the total pore surface area, at least 90% of the total pore surface or at least 99% of the total pore surface area.

As described in more detail below, methods for preparing the disclosed carbon materials may include pyrolysis of a polymer gel. In some embodiments, the pyrolyzed polymer gels have a surface area from about 100 to about 1200 $m^2/g$. In other embodiments, the pyrolyzed polymer gels have a surface area from about 500 to about 800 $m^2/g$. In other embodiments, the pyrolyzed polymer gels have a surface area from about 500 to about 700 $m^2/g$.

In other embodiments, the pyrolyzed polymer gels have a tap density from about 0.1 to about 1.0 g/cc. In other embodiments, the pyrolyzed polymer gels have a tap density from about 0.3 to about 0.6 g/cc. In other embodiments, the pyrolyzed polymer gels have a tap density from about 0.3 to about 0.5 g/cc.

The polymer gels can be prepared by the polymerization of one or more polymer precursors in an appropriate solvent system under catalytic conditions. The electrochemical modifier can be incorporated into the gel either during or after the polymerization process. Accordingly, in one embodiment the polymer gel is prepared by admixing one or more miscible solvents, one or more phenolic compounds, one or more aldehydes, one or more catalysts and an electrochemical modifier. For example in a further embodiment the polymer gel is prepared by admixing water, acetic acid, resorcinol, formaldehyde, ammonium acetate and lead acetate. Preparation of polymers gels, and carbon materials, from the same is discussed in more detail below.

2. Carbon Materials

The present disclosure is directed to a carbon material comprising an optimized pore structure. While not wishing to be bound by theory, it is believed that, in addition to the pore structure, the purity profile, surface area and other properties of the carbon materials are a function of its preparation method, and variation of the preparation parameters may yield carbon materials having different properties. Accordingly, in some embodiments, the carbon material is a pyrolyzed dried polymer gel, for example, a pyrolyzed polymer cryogel, a pyrolyzed polymer xerogel or a pyrolyzed polymer aerogel. In other embodiments, the carbon material is pyrolyzed and activated (e.g., a synthetic activated carbon material). For example, in further embodiments the carbon material is an activated dried polymer gel, an activated polymer cryogel, an activated polymer xerogel or an activated polymer aerogel.

As noted above, activated carbon particles are widely employed as an energy storage material. In this regard, a critically important characteristic is high power density, which is possible with electrodes that have low ionic resistance that yield high frequency response. It is important to achieve a low ionic resistance, for instance in situations with device ability to respond to cyclic performance is a constraint. The disclosed carbon material solves the problem of how to optimize an electrode formulation and maximize the power performance of electrical energy storage and distribution devices. Devices comprising the carbon materials exhibit long-term stability, fast response time and high pulse power performance.

The disclosed methods produce carbon materials comprising specific micropore structure, which is typically described in terms of fraction (percent) of total pore volume residing in either micropores or mesopores or both. Accordingly, in some embodiments the pore structure of the carbon materials comprises from 10% to 90% micropores. In some other embodiments the pore structure of the carbon materials comprises from 20% to 80% micropores. In other embodiments, the pore structure of the carbon materials comprises from 30% to 70% micropores. In other embodiments, the pore structure of the carbon materials comprises from 40% to 60% micropores. In other embodiments, the pore structure of the carbon materials comprises from 40% to 50% micropores. In other embodiments, the pore structure of the carbon materials comprises from 43% to 47% micropores. In certain embodiments, the pore structure of the carbon materials comprises about 45% micropores.

In some other embodiments the pore structure of the carbon materials comprises from 20% to 50% micropores. In still other embodiments the pore structure of the carbon materials comprises from 20% to 40% micropores, for example from 25% to 35% micropores or 27% to 33% micropores. In some other embodiments, the pore structure of the carbon materials comprises from 30% to 50% micropores, for example from 35% to 45% micropores or 37% to 43% micropores. In some certain embodiments, the pore structure of the carbon materials comprises about 30% micropores or about 40% micropores.

In some other embodiments the pore structure of the carbon materials comprises from 40% to 90% micropores. In still other embodiments the pore structure of the carbon materials comprises from 45% to 90% micropores, for example from 55% to 85% micropores. In some other embodiments, the pore structure of the carbon materials comprises from 65% to 85% micropores, for example from 75% to 85% micropores or 77% to 83% micropores. In yet other embodiments the pore structure of the carbon materials comprises from 65% to 75% micropores, for example from 67% to 73% micropores. In some certain embodiments, the pore structure of the carbon materials comprises about 80% micropores or about 70% micropores.

The mesoporosity of the carbon materials contributes to high ion mobility and low resistance. In some embodiments, the pore structure of the carbon materials comprises from 10% to 90% mesopores. In some other embodiments, the pore structure of the carbon materials comprises from 20% to 80% mesopores. In other embodiments, the pore structure of the carbon materials comprises from 30% to 70% mesopores. In other embodiments, the pore structure of the carbon materials comprises from 40% to 60% mesopores. In other embodiments, the pore structure of the carbon materials comprises from 50% to 60% mesopores. In other embodiments, the pore structure of the carbon materials comprises from 53% to 57% mesopores. In other embodiments, the pore structure of the carbon materials comprises about 55% mesopores.

In some other embodiments the pore structure of the carbon materials comprises from 50% to 80% mesopores. In still other embodiments the pore structure of the carbon materials comprises from 60% to 80% mesopores, for example from 65% to 75% mesopores or 67% to 73% mesopores. In some other embodiments, the pore structure of the carbon materials comprises from 50% to 70% mesopores, for example from 55% to 65% mesopores or 57% to 53% mesopores. In some certain embodiments, the pore structure of the carbon materials comprises about 30% mesopores or about 40% mesopores.

In some other embodiments the pore structure of the carbon materials comprises from 10% to 60% mesopores. In some other embodiments the pore structure of the carbon materials comprises from 10% to 55% mesopores, for example from 15% to 45% mesopores or from 15% to 40% mesopores. In some other embodiments, the pore structure of the carbon materials comprises from 15% to 35% mesopores, for example from 15% to 25% mesopores or from 17% to 23% mesopores. In some other embodiments, the pore structure of the carbon materials comprises from 25% to 35% mesopores, for example from 27% to 33% mesopores. In some certain embodiments, the pore structure of the carbon materials comprises about 20% mesopores and in other embodiments the carbon materials comprise about 30% mesopores.

The optimized blend of micropores and mesopores within the carbon materials contributes to the enhanced electrochemical performance of the same. Thus, in some embodiments the pore structure of the carbon materials comprises from 10% to 90% micropores and from 10% to 90% mesopores. In some other embodiments the pore structure of the carbon materials comprises from 20% to 80% micropores and from 20% to 80% mesopores. In other embodiments, the pore structure of the carbon materials comprises from 30% to 70% micropores and from 30% to 70% mesopores. In other embodiments, the pore structure of the carbon materials comprises from 40% to 60% micropores and from 40% to 60% mesopores. In other embodiments, the pore structure of the carbon materials comprises from 40% to 50% micropores and from 50% to 60% mesopores. In other embodiments, the pore structure of the carbon materials comprises from 43% to 47% micropores and from 53% to 57% mesopores. In other embodiments, the pore structure of the carbon materials comprises about 45% micropores and about 55% mesopores.

In still other embodiments, the pore structure of the carbon materials comprises from 40% to 90% micropores and from 10% to 60% mesopores. In other embodiments, the pore structure of the carbon materials comprises from 45% to 90% micropores and from 10% to 55% mesopores. In other embodiments, the pore structure of the carbon materials comprises from 40% to 85% micropores and from 15% to 40% mesopores. In yet other embodiments, the pore structure of the carbon materials comprises from 55% to 85% micropores and from 15% to 45% mesopores, for example from 65% to 85% micropores and from 15% to 35% mesopores. In other embodiments, the pore structure of the carbon materials comprises from 65% to 75% micropores and from 15% to 25% mesopores, for example from 67% to 73% micropores and from 27% to 33% mesopores In some other embodiments, the pore structure of the carbon materials comprises from 75% to 85% micropores and from 15% to 25% mesopores, for example from 83% to 77% micropores and from 17% to 23% mesopores. In other certain embodiments, the pore structure of the carbon materials comprises about 80% micropores and about 20% mesopores, or in other embodiments, the pore structure of the carbon materials comprises about 70% micropores and about 30% mesopores.

In still other embodiments, the pore structure comprises from 20% to 50% micropores, and from 50% to 80% mesopores. For example, in some embodiments, from 20% to 40% of the total pore volume resides in micropores and from 60% to 80% of the total pore volume resides in mesopores. In other embodiments, from 25% to 35% of the total pore volume resides in micropores and from 65% to 75% of the total pore volume resides in mesopores. For example, in some embodiments about 30% of the total pore volume resides in micropores and about 70% of the total pore volume resides in mesopores.

In still other embodiments, from 30% to 50% of the total pore volume resides in micropores and from 50% to 70% of the total pore volume resides in mesopores. In other embodiments, from 35% to 45% of the total pore volume resides in micropores and from 55% to 65% of the total pore volume resides in mesopores. For example, in some embodiments, about 40% of the total pore volume resides in micropores and about 60% of the total pore volume resides in mesopores.

In other variations of any of the foregoing carbon materials, the carbon materials do not have a substantial volume of pores greater than 20 nm. For example, in certain embodiments the carbon materials comprise less than 50%, less than 40%, less than 30%, less than 25%, less than 20%, less than 15%, less than 10%, less than 5%, less than 2.5% or even less than 1% of the total pore volume in pores greater than 20 nm.

The porosity of the carbon materials contributes to their enhanced electrochemical performance. Accordingly, in one embodiment the carbon material comprises a pore volume residing in pores less than 20 angstroms of at least 1.8 cc/g, at least 1.2, at least 0.6, at least 0.30 cc/g, at least 0.25 cc/g, at least 0.20 cc/g or at least 0.15 cc/g. In other embodiments, the carbon material comprises a pore volume residing in pores greater than 20 angstroms of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, or at least 0.5 cc/g.

In other embodiments, the carbon material comprises a pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g or at least 0.50 cc/g for pores ranging from 20 angstroms to 300 angstroms.

In yet other embodiments, the carbon materials comprise a total pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g or at least 0.20 cc/g.

In yet other embodiments, the carbon materials comprise a pore volume residing in pores of less than 20 angstroms of at least 0.2 cc/g and a pore volume residing in pores of between 20 and 300 angstroms of at least 0.8 cc/g. In yet other embodiments, the carbon materials comprise a pore volume residing in pores of less than 20 angstroms of at least 0.5 cc/g and a pore volume residing in pores of between 20 and 300 angstroms of at least 0.5 cc/g. In yet other embodiments, the carbon materials comprise a pore volume residing in pores of less than 20 angstroms of at least 0.6 cc/g and a pore volume residing in pores of between 20 and 300 angstroms of at least 2.4 cc/g. In yet other embodiments, the carbon materials comprise a pore volume residing in pores of less than 20 angstroms of at least 1.5 cc/g and a pore volume residing in pores of between 20 and 300 angstroms of at least 1.5 cc/g.

In certain embodiments a mesoporous carbon material having low pore volume in the micropore region (e.g., less than 60%, less than 50%, less than 40%, less than 30%, less than 20% microporosity) is provided. For example, the mesoporous carbon can be a polymer gel that has been pyrolyzed, but not activated. In some embodiments, the pyrolyzed mesoporous carbon comprises a specific surface area of at least 400 $m^2/g$, at least 500 $m^2/g$, at least 600 $m^2/g$, at least 675 $m^2/g$ or at least 750 $m^2/g$. In other embodiments, the mesoporous carbon material comprises a total pore volume of at least 0.50 cc/g, at least 0.60 cc/g, at least 0.70 cc/g, at least 0.80 cc/g or at least 0.90 cc/g. In yet other embodiments, the mesoporous carbon material comprises a tap density of at least 0.30 g/cc, at least 0.35 g/cc, at least 0.40 g/cc, at least 0.45 g/cc, at least 0.50 g/cc or at least 0.55 g/cc.

The carbon material comprises low total PIXE impurities (excluding the electrochemical modifier). Thus, in some embodiments the total PIXE impurity content (excluding the electrochemical modifier) of all other PIXE elements in the carbon material (as measured by proton induced x-ray emission) is less than 1000 ppm. In other embodiments, the total PIXE impurity content (excluding the electrochemical modifier) of all other PIXE elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the carbon material is a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

In addition to low content of undesired PIXE impurities, the disclosed carbon materials may comprise high total carbon content. In addition to carbon, the carbon material may also comprise oxygen, hydrogen, nitrogen and the electrochemical modifier. In some embodiments, the material comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of the carbon material may, in some instances, have an effect on the electrochemical performance of the carbon material. Accordingly, in some embodiments, the ash content of the carbon material ranges from 0.1% to 0.001% weight percent ash, for example in some specific embodiments the ash content of the carbon material is less than 0.1%, less than 0.08%, less than 0.05%, less than 0.03%, than 0.025%, less than 0.01%, less than 0.0075%, less than 0.005% or less than 0.001%.

In other embodiments, the carbon material comprises a total PIXE impurity content of less than 500 ppm and an ash content of less than 0.08%. In further embodiments, the carbon material comprises a total PIXE impurity content of less than 300 ppm and an ash content of less than 0.05%. In other further embodiments, the carbon material comprises a total PIXE impurity content of less than 200 ppm and an ash content of less than 0.05%. In other further embodiments, the carbon material comprises a total PIXE impurity content of less than 200 ppm and an ash content of less than 0.025%. In other further embodiments, the carbon material comprises a total PIXE impurity content of less than 100 ppm and an ash content of less than 0.02%. In other further embodiments, the carbon material comprises a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the carbon material is less than 1000 ppm, less than 500 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some embodiments, the carbon material comprises undesired PIXE impurities near or below the detection limit of the proton induced x-ray emission analysis. For example, in some embodiments the carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

In some embodiments, the carbon materials comprise less than 10 ppm iron. In other embodiments, the carbon materials comprise less than 3 ppm nickel. In other embodiments, the carbon materials comprise less than 30 ppm sulfur. In other embodiments, the carbon materials comprise less than 1 ppm chromium. In other embodiments, the carbon materials comprise less than 1 ppm copper. In other embodiments, the carbon materials comprise less than 1 ppm zinc.

The disclosed carbon materials also comprise a high surface area. While not wishing to be bound by theory, it is thought that such high surface area may contribute, at least in part, to their superior electrochemical performance. Accordingly, in some embodiments, the carbon material comprises a BET specific surface area of at least 100 $m^2/g$, at least 300 $m^2/g$, at least 500 $m^2/g$, at least 1000 $m^2/g$, at least 1500 $m^2/g$, at least 2000 $m^2/g$, at least 2400 $m^2/g$, at least 2500 $m^2/g$, at least 2750 $m^2/g$ or at least 3000 $m^2/g$. In other embodiments, the BET specific surface area ranges from about 100 $m^2/g$ to about 3000 $m^2/g$, for example from about 500 $m^2/g$ to about 1000 $m^2/g$, from about 1000 $m^2/g$ to about 1500 $m^2/g$, from about 1500 $m^2/g$ to about 2000 $m^2/g$, from about 2000 $m^2/g$ to about 2500 $m^2/g$ or from about 2500 $m^2/g$ to about 3000 $m^2/g$. For example, in some embodiments of the foregoing, the carbon material is activated.

In still other examples, the carbon material comprises less than 100 ppm sodium, less than 100 ppm silicon, less than 10 ppm sulfur, less than 25 ppm calcium, less than 1 ppm iron, less than 2 ppm nickel, less than 1 ppm copper, less than 1 ppm chromium, less than 50 ppm magnesium, less than 10 ppm aluminum, less than 25 ppm phosphorous, less than 5 ppm chlorine, less than 25 ppm potassium, less than 2 ppm titanium, less than 2 ppm manganese, less than 0.5 ppm cobalt and less than 5 ppm zinc as measured by proton induced x-ray emission, and wherein all other elements having atomic numbers ranging from 11 to 92 are undetected by proton induced x-ray emission.

In another embodiment, the carbon material comprises a tap density between 0.1 and 1.0 g/cc, between 0.2 and 0.8 g/cc, between 0.3 and 0.5 g/cc or between 0.4 and 0.5 g/cc. In another embodiment, the carbon material has a total pore volume of at least 0.1 $cm^3/g$, at least 0.2 $cm^3/g$, at least 0.3 $cm^3/g$, at least 0.4 $cm^3/g$, at least 0.5 $cm^3/g$, at least 0.7 $cm^3/g$, at least 0.75 $cm^3/g$, at least 0.9 $cm^3/g$, at least 1.0 $cm^3/g$, at least 1.1 $cm^3/g$, at least 1.2 $cm^3/g$, at least 1.3 $cm^3/g$, at least 1.4 $cm^3/g$, at least 1.5 $cm^3/g$ or at least 1.6 $cm^3/g$.

The pore size distribution of the disclosed carbon materials is one parameter that may have an effect on the electrochemical performance of the carbon materials. For example, the carbon materials may comprise mesopores with a short effective length (i.e., less than 10 nm, less than 5, nm or less than 3 nm as measured by TEM) which decreases ion diffusion distance and may be useful to enhance ion transport and maximize power.

In another embodiment, the carbon material comprises a fractional pore surface area of pores between 20 and 300 angstroms that comprises at least 40% of the total pore surface area, at least 50% of the total pore surface area, at least 70% of the total pore surface area or at least 80% of the total pore surface area. In another embodiment, the carbon material comprises a fractional pore surface area of pores at or below 20 nm that comprises at least 20% of the total pore surface area, at least 30% of the total pore surface area, at least 40% of the total pore surface area or at least 50% of the total pore surface area.

In another embodiment, the carbon material comprises pores predominantly in the range of 1000 angstroms or lower, for example 100 angstroms or lower, for example 50 angstroms or lower. Alternatively, the carbon material comprises micropores in the range of 0-20 angstroms and mesopores in the range of 20-300 angstroms. The ratio of pore volume or pore surface in the micropore range compared to the mesopore range can be in the range of 95:5 to 5:95. Alternatively, the ratio of pore volume or pore surface in the micropore range compared to the mesopore range can be in the range of 20:80 to 60:40.

In other embodiments, the carbon materials are mesoporous and comprise monodisperse mesopores. As used herein, the term "monodisperse" when used in reference to a pore size refers generally to a span (further defined as (Dv90-Dv10)/Dv, 50 where Dv10, Dv50 and Dv90 refer to the pore size at 10%, 50% and 90% of the distribution by volume of about 3 or less, typically about 2 or less, often about 1.5 or less.

Yet in other embodiments, the carbons materials comprise a pore volume of at least 1 cc/g, at least 2 cc/g, at least 3 cc/g, at least 4 cc/g or at least 7 cc/g. In one particular embodiment, the carbon materials comprise a pore volume of from 1 cc/g to 7 cc/g.

In other embodiments, the carbon materials comprise at least 50% of the total pore volume residing in pores with a diameter ranging from 50 Å to 5000 Å. In some instances, the carbon materials comprise at least 50% of the total pore volume residing in pores with a diameter ranging from 50 Å to 500 Å. Still in other instances, the carbon materials comprise at least 50% of the total pore volume residing in pores with a diameter ranging from 500 Å to 1000 Å. Yet in other instances, the carbon materials comprise at least 50% of the total pore volume residing in pores with a diameter ranging from 1000 Å to 5000 Å.

In some embodiments, the mean particle diameter for the carbon materials ranges from 1 to 1000 microns. In other embodiments the mean particle diameter for the carbon materials ranges from 1 to 100 microns. Still in other embodiments the mean particle diameter for the carbon materials ranges from 1 to 50 microns. Yet in other embodiments, the mean particle diameter for the carbon materials ranges from 5 to 15 microns or from 1 to 5 microns. Still in other embodiments, the mean particle diameter for the carbon materials is about 10 microns. Still in other embodiments, the mean particle diameter for the carbon materials is less than 4, is less than 3, is less than 2, is less than 1 microns.

In some embodiments, the carbon materials exhibit a mean particle diameter ranging from 1 nm to 10 nm. In other embodiments, the mean particle diameter ranges from 10 nm to 20 nm. Yet in other embodiments, the mean particle diameter ranges from 20 nm to 30 nm. Still in other embodiments, the mean particle diameter ranges from 30 nm to 40 nm. Yet still in other embodiments, the mean particle diameter ranges from 40 nm to 50 nm. In other embodiments, the mean particle diameter ranges from 50 nm to 100 nm.

In another embodiment of the present disclosure, the carbon material is prepared by a method disclosed herein, for example, in some embodiments the carbon material is prepared by a method comprising pyrolyzing a dried polymer gel as disclosed herein. In some embodiments, the pyrolyzed polymer gel is further activated to obtain an activated carbon material. Carbon materials comprising an electrochemical modifier can be prepared by any number of methods described in more detail below.

B. Preparation of Carbon Materials Comprising Optimized Pore Size Distributions

Methods for preparing carbon materials which comprise electrochemical modifiers and which comprise high surface area, high porosity and low levels of undesirable impurities are not known in the art. Current methods for preparing carbon materials of high surface area and high porosity result in carbon materials having high levels of undesirable impurities. Electrodes prepared by incorporating an electrochemical modifier into these carbon materials have poor electrical performance as a result of the residual impurities. Accordingly, in one embodiment the present disclosure provides a method for preparing carbon materials comprising an electrochemical modifier, wherein the carbon materials comprise a high surface area, high porosity and low levels of undesirable impurities. In some embodiments, the methods comprise preparation of a polymer gel by a sol gel process followed by pyrolysis of the dried polymer gel and optional activation of the pyrolyzed polymer gel. The sol gel process provides significant flexibility such that an electrochemical modifier can be incorporated at any number of steps. In other embodiments, carbon materials from other sources (e.g., carbon nanotubes, carbon fibers, etc.) can be impregnated with an electrochemical modifier. In one embodiment, a method for preparing a polymer gel comprising an electrochemical modifier is provided. In another embodiment, methods for preparing pyrolyzed polymer gels comprising electrochemical modifiers or activated carbon materials comprising electrochemical modifiers is provided. Details of the variable process parameters of the various embodiments of the disclosed methods are described below.

1. Preparation of Polymer Gels

The polymer gels may be prepared by a sol gel process. For example, the polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde.

The sol gel polymerization process is generally performed under catalytic conditions. Accordingly, in some embodiments, preparing the polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to phenolic compound may have an effect on the final properties of the polymer gel as well as the final properties of the carbon materials, for example. Thus, in some embodiments such catalysts are used in the range of molar ratios of 5:1 to 2000:1 phenolic compound:

catalyst. In some embodiments, such catalysts can be used in the range of molar ratios of 20:1 to 200:1 phenolic compound: catalyst. For example in other embodiments, such catalysts can be used in the range of molar ratios of 5:1 to 100:1 phenolic compound: catalyst.

The reaction solvent is another process parameter that may be varied to obtain the desired properties (e.g., surface area, porosity, purity, etc.) of the polymer gels and carbon materials. In some embodiments, the solvent for preparation of the polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method the solvent is a binary solvent comprising acetic acid and water. In further embodiments, the solvent comprises a ratio of acetic acid to water of 99:1, 90:10, 75:25, 50:50, 25:75, 20:80, 10:90 or 1:90. In other embodiments, acidity is provided by adding a solid acid to the reaction solvent.

Some embodiments of the disclosed method do not comprise a solvent exchange step (e.g., exchange t-butanol for water) prior to drying (e.g., lyophilization). For example, in one embodiment of any of the methods described herein, before freezing, the polymer gel or polymer gel particles are rinsed with water. In one embodiment, the average diameter of the polymer gel particles prior to freezing is less than 25 mm, for example, between 0.001 mm and 25 mm; alternatively, the average diameter of the polymer gel particles prior to freezing is between 0.01 mm and 15 mm, for example, between 1.0 mm and 15 mm. In some examples, the polymer gel particles are between 1 mm and 10 mm. In further embodiments, the polymer gel particles are frozen via immersion in a medium having a temperature of below about −10° C., for example, below about −20° C., or alternatively below about −30° C. For example, the medium may be liquid nitrogen or ethanol (or other organic solvent) in dry ice or ethanol cooled by another means. In some embodiments, drying under vacuum comprises subjecting the frozen particles to a vacuum pressure of below about 3000 mTorr. Alternatively, drying under vacuum comprises subjecting the frozen particles to a vacuum pressure of below about 1000 mTorr. Alternatively, drying under vacuum comprises subjecting the frozen particles to a vacuum pressure of below about 300 mTorr. Alternatively, drying under vacuum comprises subjecting the frozen particles to a vacuum pressure of below about 100 mTorr.

Other methods of rapidly freezing the polymer gel particles are also envisioned. For example, in another embodiment the polymer gel is rapidly frozen by co-mingling or physical mixing of polymer gel particles with a suitable cold solid, for example, dry ice (solid carbon dioxide). Another envisioned method comprises using a blast freezer with a metal plate at −60° C. to rapidly remove heat from the polymer gel particles scattered over its surface. Another method of rapidly cooling water in a polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen. In yet other embodiments, the gas may have a temperature of about −78° C. For example, in some embodiments, the gas is carbon dioxide.

In other embodiments, the polymer gel particles are frozen on a lyophilizer shelf at a temperature of −20° C. or lower. For example, in some embodiments the polymer gel particles are frozen on the lyophilizer shelf at a temperature of −30° C. or lower. In some other embodiments, the polymer gel monolith is subjected to a freeze thaw cycle (from room temperature to −20° C. or lower and back to room temperature), physical disruption of the freeze-thawed gel to create particles, and then further lyophilization processing. For example, in some embodiments, the polymer gel monolith is subjected to a freeze thaw cycle (from room temperature to −30° C. or lower and back to room temperature), physical disruption of the freeze-thawed gel to create particles, and then further lyophilization processing.

In some embodiments of the methods described herein, the molar ratio of phenolic precursor to catalyst is from about 5:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 25:1 to about 50:1. In further embodiments, the molar ratio of phenolic precursor to catalyst is from about 100:1 to about 5:1.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 5:1.

Polymerization to form a polymer gel can be accomplished by various means described in the art and may include addition of an electrochemical modifier. For instance, polymerization can be accomplished by incubating suitable polymer precursor materials, and optionally an electrochemical modifier, in the presence of a suitable catalyst for a sufficient period of time. The time for polymerization can be a period ranging from minutes or hours to days, depending on the temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment wherein one polymer precursor is resorcinol and one polymer precursor is formaldehyde, the temperature can range from about 20° C. to about 100° C., typically from about 25° C. to about 90° C. In some embodiments, polymerization can be accomplished by incubation of suitable synthetic polymer precursor materials in the presence of a catalyst for at least 24 hours at about 90° C. Generally polymerization can be accomplished in between about 6 and about 24 hours at about 90° C., for example between about 18 and about 24 hours at about 90° C.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldehydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

The total solids content in the solution or suspension prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the polymer gels disclosed herein include but are not limited to water or alcohols such as, for example, ethanol, t butanol, methanol or combinations thereof as well as aqueous mixtures of the same. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of the polymer gels include volatile basic catalysts that facilitate polymerization of the precursor materials into a monolithic polymer. The catalyst can also comprise various combinations of the catalysts described above. In embodiments comprising phenolic compounds, such catalysts can be used in the range of molar ratios of 5:1 to 200:1 phenolic compound:catalyst. For example, in some specific embodiments such catalysts can be used in the range of molar ratios of 25:1 to 100:1 phenolic compound:catalyst.

2. Creation of Polymer Gel Particles

A monolithic polymer gel can be physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 10 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In a specific embodiment, a roller mill is employed. A roller mill has three stages to gradually reduce the size of the gel particles. The polymer gels are generally very brittle and are not damp to the touch. Consequently they are easily milled using this approach; however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $1/8^{th}$ inch. In another embodiment, the rotary crusher has a screen mesh size of about $3/8^{th}$ inch. In another embodiment, the rotary crusher has a screen mesh size of about $5/8^{th}$ inch. In another embodiment, the rotary crusher has a screen mesh size of about $3/8^{th}$ inch.

Milling can be accomplished at room temperature according to methods well known to those of skill in the art. Alternatively, milling can be accomplished cryogenically, for example by co-milling the polymer gel with solid carbon dioxide (dry ice) particles. In this embodiment, the two steps of (a) creating particles from the monolithic polymer gel and (b) rapid, multidirectional freezing of the polymer gel are accomplished in a single process.

3. Rapid Freezing of Polymer Gels

After the polymer gel particles are formed from the monolithic polymer gel, freezing of the polymer gel particles may be accomplished rapidly and in a multi-directional fashion as described in more detail above. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about −10° C. or lower, for example, −20° C. or lower, or for example, to at least about −30° C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can also be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration or product cooling until complete freezing is achieved. In the specific case of water and acetic acid (which as pure substances exhibit freezing points of 0° C. and 17° C., respectively), the eutectic composition is comprised of approximately 59% acetic acid and 41% water and freezes at about −27° C. Accordingly, in one embodiment, the mixed solvent system is the eutectic composition, for example, in one embodiment the mixed solvent system comprises 59% acetic acid and 41% water.

4. Drying of Polymer Gels

In one embodiment, the frozen polymer gel particles containing a fine ice matrix are lyophilized under conditions designed to avoid collapse of the material and to maintain fine surface structure and porosity in the dried product. Generally drying is accomplished under conditions where the temperature of the product is kept below a temperature that would otherwise result in collapse of the product pores, thereby enabling the dried material to retain an extremely high surface area.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments prior to drying, the aqueous content of the polymer gel is in the range of about 50% to about 99%. In certain embodiments upon drying, the aqueous content of the polymer cryogel is about 10%, alternately less than about 5% or less than about 2.5%.

A lyophilizer chamber pressure of about 2250 microns results in a primary drying temperature in the drying product of about −10° C. Drying at about 2250 micron chamber pressure or lower case provides a product temperature during primary drying that is no greater than about −10° C. As a further illustration, a chamber pressure of about 1500 microns results in a primary drying temperature in the drying product of about −15° C. Drying at about 1500 micron chamber pressure or lower provides a product temperature during primary drying that is no greater than about −15° C. As yet a further illustration, a chamber pressure of about 750 microns results in a primary drying temperature in the drying product of about −20° C. Drying at 750 micron chamber pressure or lower provides a product temperature during primary drying that is no greater than about −20° C. As yet a further illustration, a chamber pressure of about 300 microns results in a primary drying temperature in the drying product of about −30° C. Drying at 300 micron chamber pressure or lower provides a product temperature during primary drying that is no greater than about −30° C.

5. Pyrolysis and Activation of Polymer Gels

The polymer gels described above, can be further processed to obtain carbon materials. Such processing includes, for example, pyrolysis and/or activation. Generally, in the pyrolysis process, dried polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (the period of time during which the sample is at the desired temperature) is from about 0 minutes to about 120 minutes, from about 0 minutes to about 60 minutes, from about 0 minutes to about 30 minutes, from about 0 minutes to about 10 minutes, from about 0 to 5 minutes or from about 0 to 1 minute.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to 2400° C. In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 850° C. to about 1050° C. In other embodiments pyrolysis dwell temperature ranges from about 800° C. to about 900° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, oxygen and combinations thereof. Activating agents may also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time is between 1 minute and 48 hours. In other embodiments, the activation time is between 1 minute and 24 hours. In other embodiments, the activation time is between 5 minutes and 24 hours. In other embodiments, the activation time is between 1 hour and 24 hours. In further embodiments, the activation time is between 12 hours and 24 hours. In certain other embodiments, the activation time is between 30 min and 4 hours. In some further embodiments, the activation time is between 1 hour and 2 hours.

Pyrolyzed polymer gels may be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

C. Characterization of Polymer Gels and Carbon Materials

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity content of the carbon materials can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of impurities present in the carbon materials is determined by PIXE analysis.

D. Devices Comprising the Carbon Materials

1. EDLCs

The disclosed carbon materials can be used as electrode material in any number of electrical energy storage and distribution devices. One such device is an ultracapacitor. Ultracapacitors comprising carbon materials are described in detail in co-owned U.S. Pat. No. 7,835,136 which is hereby incorporated in its entirety.

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the disclosed carbon material can be employed in various electronic devices where high power is desired. Accordingly, in one embodiment an electrode comprising the carbon materials is provided. In another embodiment, the electrode comprises activated carbon material. In a further embodiment, an ultracapacitor comprising an electrode comprising the carbon materials is provided. In a further embodiment of the foregoing, the ultrapure synthetic carbon material comprises an optimized balance of micropores and mesopores and described above.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

Accordingly, in certain embodiments the present disclosure provides an electrical energy storage device comprising any of the foregoing carbon materials, for example a carbon material comprising a pore structure, the pore structure comprising micropores, mesopores and a total pore volume, wherein from 20% to 80% of the total pore volume resides in micropores and from 20% to 80% of the total pore volume resides in mesopores and less than 10% of the total pore volume resides in pores greater than 20 nm.

In some embodiments, the device is an electric double layer capacitor (EDLC) device comprising:

a) a positive electrode and a negative electrode wherein each of the positive and the negative electrodes comprise the carbon material;

b) an inert porous separator; and c) an electrolyte;

wherein the positive electrode and the negative electrode are separated by the inert porous separator.

In one embodiment, an ultracapacitor device comprising the carbon material comprises a gravimetric power of at least 5 W/g, at least 10 W/g, at least 15 W/g, at least 20 W/g, at least 25 W/g, at least 30 W/g, at least 35 W/g, at least 50 W/g. In another embodiment, an ultracapacitor device comprising the carbon material comprises a volumetric power of at least 2 W/g, at least 4 W/cc, at least 5 W/cc, at least 10 W/cc, at least 15 W/cc or at least 20 W/cc. In another embodiment, an ultracapacitor device comprising the carbon material carbon material comprises a gravimetric energy of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 wh/kg or at least 25.0 Wh/kg. In another embodiment, an ultracapacitor device comprising the carbon material comprises a volumetric energy of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter or at least 20.0 Wh/liter.

In some embodiments of the foregoing, the gravimetric power, volumetric power, gravimetric energy and volumetric energy of an ultracapacitor device comprising the carbon material are measured by constant current discharge from 2.7 V to 1.89 V employing a 1.0 M solution of tetraethylammonium-tetrafluoroborate in acetonitrile (1.0 M TEATFB in AN) electrolyte and a 0.5 second time constant.

In one embodiment, an ultracapacitor device comprising the carbon material comprises a gravimetric power of at least 10 W/g, a volumetric power of at least 5 W/cc, a gravimetric capacitance of at least 100 F/g (@0.5 A/g) and a volumetric capacitance of at least 10 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluoroborate or triethylmethyl aminotetrafluoroborate or other electrolyte salt known in the art, or liquid electrolyte known in the art.

In one embodiment, an ultracapacitor device comprising the carbon material comprises a gravimetric power of at least 15 W/g, a volumetric power of at least 10 W/cc, a gravimetric capacitance of at least 110 F/g (@0.5 A/g) and a volumetric capacitance of at least 15 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluoroborate or triethylmethyl aminotetrafluoroborate or other electrolyte salt known in the art, or liquid electrolyte known in the art.

In one embodiment, an ultracapacitor device comprising the carbon material comprises a gravimetric capacitance of at least 90 F/g, at least 95 F/g, at least 100 F/g, at least 105 F/g, at least 110 F/g, at least 115 F/g, at least 120 F/g, at least 125 F/g, or at least 130 F/g. In another embodiment, an ultracapacitor device comprising the carbon material comprises a volumetric capacitance of at least 5 F/cc, at least 10 F/cc, at least 15 F/cc, at least 20 F/cc, or at least 25 F/cc. In some embodiments of the foregoing, the gravimetric capacitance and volumetric capacitance are measured by constant current discharge from 2.7 V to 0.1 V with a 5-second time constant and employing a 1.8 M solution of tetraethylammonium-tetrafluoroborate in acetonitrile (1.8 M TEATFB in AN) electrolyte and a current density of 0.5 A/g, 1.0 A/g, 4.0 A/g or 8.0 A/g.

In one embodiment, the present disclosure provides ultracapacitors comprising a carbon material as disclosed herein, wherein the percent decrease in original capacitance (i.e., capacitance before being subjected to voltage hold) of the ultracapacitor comprising the carbon material after a voltage hold period is less than the percent decrease in original capacitance of an ultracapacitor comprising known carbon materials. In one embodiment, the percent of original capacitance remaining for an ultracapacitor comprising the carbon material after a voltage hold at 2.7 V for 24 hours at 65° C. is at least 90%, at least 80%, at least 70%, at least 60%, at least 50%, at least 40%, at least 30% at least 20% or at least 10%. In further embodiments of the foregoing, the percent of original capacitance remaining after the voltage hold period is measured at a current density of 0.5 A/g, 1 A/g, 4 A/g or 8 A/g.

In another embodiment, the present disclosure provides ultracapacitors comprising a carbon material as disclosed herein, wherein the percent decrease in original capacitance of the ultracapacitor comprising the carbon material after repeated voltage cycling is less than the percent decrease in original capacitance of an ultracapacitor comprising known carbon materials subjected to the same conditions. For example, in one embodiment, the percent of original capacitance remaining for an ultracapacitor comprising the carbon material is more than the percent of original capacitance remaining for an ultracapacitor comprising known carbon materials after 1000, 2000, 4000, 6000, 8000, or 1000 voltage cycling events comprising cycling between 2 V and 1V at a current density of 4 A/g. In another embodiment, the percent of original capacitance remaining for an ultracapacitor comprising the carbon material after 1000, 2000, 4000, 6000, 8000, or 1000 voltage cycling events comprising cycling between 2 V and 1V at a current density of 4 A/g, is at least 90%, at least 80%, at least 70%, at least 60%, at least 50%, at least 40%, at least 30% at least 20% or at least 10%.

In still other embodiments, the EDLC device comprises a gravimetric capacitance of at least of at least 13 F/cc as measured by constant current discharge from 2.7 V to 0.1 V and with at least 0.24 Hz frequency response and employing a 1.8 M solution of tetraethylammonium-tetrafluoroborate in acetonitrile electrolyte and a current density of 0.5 A/g. Other embodiments include and EDLC device, wherein the EDLC device comprises a gravimetric capacitance of at least of at least 17 F/cc as measured by constant current discharge from 2.7 V to 0.1 V and with at least 0.24 Hz frequency response and employing a 1.8 M solution of tetraethylammonium-tetrafluororoborate in acetonitrile electrolyte and a current density of 0.5 A/g.

As noted above, the carbon material can be incorporated into ultracapacitor devices. In some embodiments, the carbon material is milled to an average particle size of about 10 microns using a jetmill according to the art. While not wishing to be bound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

In further embodiments, after jet milling the carbon is blended with a fibrous Teflon binder (3% by weight) to hold the particles together in a sheet. The carbon Teflon mixture is kneaded until a uniform consistency is reached. Then the mixture is rolled into sheets using a high-pressure roller-former that results in a final thickness of 50 microns. These electrodes are punched into discs and heated to 195° C. under a dry argon atmosphere to remove water and/or other airbourne contaminants. The electrodes are weighed and their dimensions measured using calipers.

The carbon electrodes of the EDLCs are wetted with an appropriate electrolyte solution. Examples of solvents for use in electrolyte solutions for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); TEMATFB (tri-ethyl,methylammonium tetrafluoroborate); EMITFB (1-ethyl-3-methylimidazolium tetrafluoroborate), tetramethylammonium or triethylammonium based salts. Further the electrolyte can be a water based acid or base electrolyte such as mild sulfuric acid or potassium hydroxide.

In some embodiments, the electrodes are wetted with a 1.0 M solution of tetraethylammonium-tetrafluororoborate in acetonitrile (1.0 M TEATFB in AN) electrolyte. In other embodiments, the electrodes are wetted with a 1.0 M solution of tetraethylammonium-tetrafluororoborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for about 20 minutes or more depending on the porosity of the sample.

In some embodiments, the capacitance and power output are measured using cyclic voltametry (CV), chronopotentiometry (CP) and impedance spectroscopy at various voltages (ranging from 1.0-2.5 V maximum voltage) and current levels (from 1-10 mA) on a Biologic VMP3 electrochemical workstation. In this embodiment, the capacitance may be calculated from the discharge curve of the potentiogram using the formula:

$$C = \frac{I \times \Delta t}{\Delta V}$$ Equation 1 where I is the current (A) and $\Delta V$ is the voltage drop, $\Delta t$ is the time difference. Because in this embodiment the test capacitor is a symmetric carbon-carbon (C—C) electrode, the specific capacitance is determined from:

$$C_s = 2C/m_e$$ Equation 2 where $m_e$ is the mass of a single electrode. The specific energy and power may be determined $$E_s = \frac{1}{4} \frac{CV_{max}^2}{m_e}$$ Equation 3

$$P_s = \frac{E_s}{4ESR}$$ Equation 4 where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed carbon materials also find utility as electrodes in a any number of types of batteries. One such battery is the metal air battery, for example lithium air batteries. Lithium air batteries generally comprise an electrolyte interposed between positive electrode and negative electrodes. The positive electrode generally comprises a lithium compound such as lithium oxide or lithium peroxide and serves to oxidize or reduce oxygen. The negative electrode generally comprises a carbonaceous substance which absorbs and releases lithium ions. As with supercapacitors, batteries such as lithium air batteries which comprise the disclosed carbon materials are expected to be superior to batteries comprising known carbon materials. Accordingly, in one embodiment the present invention provides a metal air battery, for example a lithium air battery, comprising a carbon material as disclosed herein.

Any number of other batteries, for example, zinc-carbon batteries, lithium/carbon batteries, lead acid batteries and the like are also expected to perform better with the carbon materials. One skilled in the art will recognize other specific types of carbon containing batteries which will benefit from the disclosed carbon materials. Accordingly, in another embodiment the present invention provides a battery, in particular a zinc/carbon, a lithium/carbon batteries or a lead acid battery comprising a carbon material as disclosed herein.

One embodiment is directed to a lead acid battery comprising the disclosed carbon materials, for example a lead/acid battery comprising:

a) at least one positive electrode comprising a first active material in electrical contact with a first current collector;

b) at least one negative electrode comprising a second active material in electrical contact with a second current collector; and c) an electrolyte;

wherein the positive electrode and the negative electrode are separated by an inert porous separator, and wherein at least one of the first or second active materials comprises the carbon material.

Active materials within the scope of the present disclosure include materials capable of storing and/or conducting electricity. The active material can be any active material known in the art and useful in lead acid batteries, for example the active material may comprise lead, lead (II) oxide, lead (IV) oxide, or combinations thereof and may be in the form of a paste.

Another embodiment of any of the above devices, the carbon material comprises the same micropore to mesopore distribution but at a lower surface area range. This embodiment is prepared by synthesizing the same base high purity polymer structure that yields the same optimized micropore to mesopore volume distribution with low surface functionality upon pyrolysis (but no activation). The result of lower surface area optimized pore structure in a battery application like lead acid batteries is a maximization of an electrode formulation with a highly conductive network. It is also theorized that high mesopore volume may be an excellent structure to allow high ion mobility in many other energy storage systems such as lead acid, lithium ion, etc.

EXAMPLES

The carbon materials disclosed in the following Examples were prepared according to the methods disclosed herein. Chemicals were obtained from commercial sources at reagent grade purity or better and were used as received from the supplier without further purification.

Unless indicated otherwise, the following conditions were generally employed for preparation of the carbon materials and precursors. Phenolic compound and aldehyde were reacted in the presence of a catalyst in a binary solvent system (e.g., water and acetic acid). The molar ratio of phenolic compound to aldehyde was typically 0.5 to 1. The reaction was allowed to incubate in a sealed container at temperatures of up to 85 C. for up to 24 h. The resulting polymer hydrogel contained water, but no organic solvent; and was not subjected to solvent exchange of water for an organic solvent, such as t-butanol. The polymer hydrogel monolith was then physically disrupted, for example by grinding, to form polymer hydrogel particles having an average diameter of less than about 5 mm. Unless stated otherwise, the particles were then rapidly frozen, generally by immersion in a cold fluid (e.g., liquid nitrogen or ethanol/dry ice) and lyophilized. Generally, the lyophilizer shelf was pre-cooled to −30° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of 25 to +100° C. Chamber pressure can be held in the range of 50 to 3000 mTorr. For instance, the chamber pressure can be controlled in the range of 150 to 300 mTorr.

The dried polymer hydrogel was typically pyrolyzed by heating in a nitrogen atmosphere at temperatures ranging from 700-1200° C. for a period of time as specified in the examples. Activation conditions generally comprised heating a pyrolyzed polymer hydrogel in a $CO_2$ atmosphere at temperatures ranging from 800-1000° C. for a period of time as specified in the examples. Specific pyrolysis and activation conditions were as described in the following examples.

Example 1

Preparation of Dried Polymer Gel

A polymer gel was prepared by polymerization of resorcinol and formaldehyde (0.5:1) in a water/acetic acid solvent (75:25) in the presence of ammonium acetate catalyst. The resorcinol to solvent ration (R/S) was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4750 micron mesh sieve. The sieved particles were flash frozen by immersion in liquid nitrogen, loaded into a lyophilization tray at a loading of 3 to 7 g/in$^2$, and lyophilized at approximately 50 mTorr. The time to dry (as inferred from time for product to reach within 2° C. of shelf temperature) varied with product loading on the lyophilizer shelf.

The mass loss on drying the polymer gel was 73.4%. The surface area of the dried polymer gel was determined to be 752 m$^2$/g, the total pore volume was 1.40 cc/g and the tap density was 0.22 g/cc. The pore size distribution of two different batches of dried polymer gel is shown in FIG. 1.

Example 2

Preparation of Pyrolyzed Carbon Material from Dried Polymer Gel

Dried polymer gel prepared according to Example 2 was pyrolyzed by passage through a rotary kiln at 850° C. with a nitrogen gas flow of 200 L/h. The weight loss upon pyrolysis was determined to be 56.2%

The surface area of the pyrolyzed dried polymer gel was examined by nitrogen surface analysis using a surface area and porosity analyzer. The measured specific surface area using the standard BET approach was 726 m$^2$/g, the total pore volume was 0.71 cc/g and the tap density was 0.42 g/cc. Carbon materials comprising different properties (e.g., surface area, pore structure, etc.) can be prepared by altering the pyrolysis conditions (e.g., temperature, time, etc.) described above.

Example 3

Production of Activated Carbon

Pyrolyzed carbon material prepared according to Example 2 was activated a batch rotary kiln at 900° C. under a $CO_2$ for 660 min, resulting in a total weight loss of 64.8%.

The surface area of the activated carbon was examined by nitrogen surface analysis using a surface area and porosity analyzer. The measured specific surface area using the BET approach was 1989 m$^2$/g, the total pore volume was 1.57 cc/g and the tap density was 0.28 g/cc.

Figure 2:
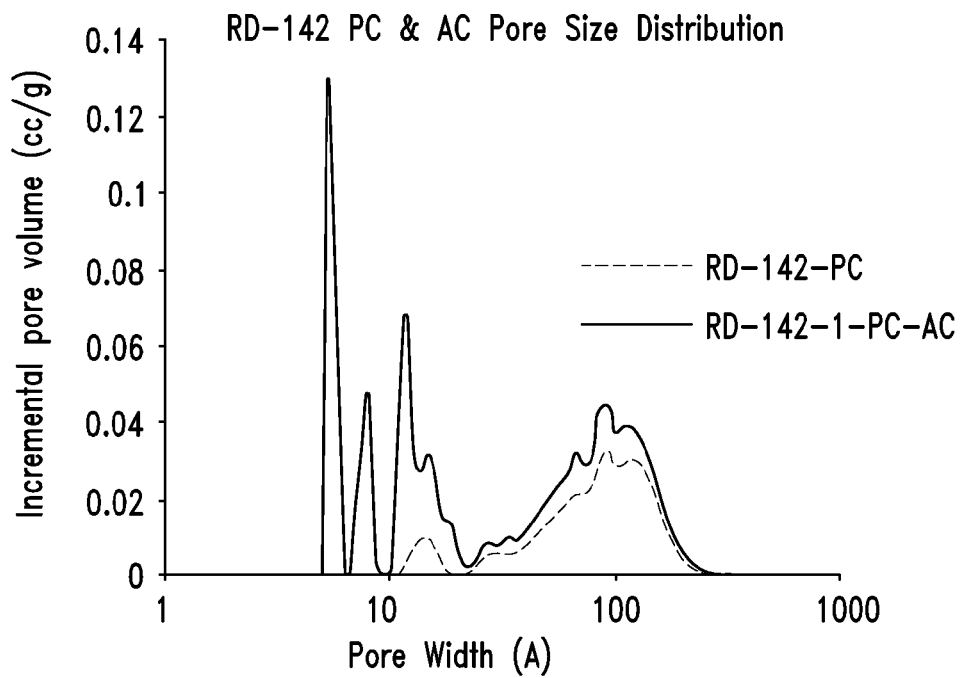
FIG. 2 is an overlay of the pore size distributions of pyrolyzed carbon material and activated carbon material.

FIG. 2 shows an overlay of the pore size distributions of the pyrolyzed carbon material of Example 2 and the activated carbon material of Example 3. Note that the pore size distribution for the activated carbon was measured on a micromeritics ASAP2020, a micropore-capable analyzer with a higher resolution (lower pore size volume detection) than the Tristar 3020 that was used to measure the pore size distribution for the pyrolyzed carbon.

From the DFT cumulative volume plot for the activated carbon material of Example 3, it was determined that the 44% of the pore volume resides in micropores and 56% of the pore volume resides in mesopores. Carbon materials comprising different properties (e.g., surface area, pore structure, etc.) can be prepared by altering the activation conditions (e.g., temperature, time, etc.) described above.

Example 4

Micronization of Activated Carbon Via Jet Milling

Activated carbon prepared according to Example 3 was jet milled using a Jet Pulverizer Micron Master 2 inch diameter jet mill. The conditions comprised about 0.7 lbs of activated carbon per hour, nitrogen gas flow about 20 scf per min and about 100 psi pressure. The average particle size after jet milling was about 8 to 10 microns.

Example 5

Purity Analysis of Activated Carbon & Comparison Carbons

Carbon samples prepared according to the general procedures herein were examined for their impurity content via proton induced x-ray emission (PIXE). PIXE is an industry-standard, highly sensitive and accurate measurement for simultaneous elemental analysis by excitation of the atoms in a sample to produce characteristic X-rays which are detected and their intensities identified and quantified. PIXE is capable of detection of all elements with atomic numbers ranging from 11 to 92 (i.e., from sodium to uranium).

The PIXE impurities (Imp.) detected in carbon materials as disclosed herein as well as other commercial carbon materials for comparison purposes is presented in Table 1. Carbon 1 is a pyrolyzed (but not activated) carbon material. Carbons 2 and 3 are pyrolyzed and activated carbon materials. Carbon 4 is an activated carbon denoted "MSP-20" obtained from Kansai Coke and Chemicals Co., Ltd. (Kakogawa, Japan), Carbon 5 is an activated carbon denoted "YP-50F(YP-17D)" obtained from Kuraray Chemical Co. (Osaka, Japan).

As seen in Table 1, the carbon materials according to the instant disclosure have a lower PIXE impurity content and lower ash content as compared to other known activated carbon samples.

TABLE 1

Purity Analysis of Activated Carbon & Comparison Carbons

| | Impurity Concentration (PPM) | | | | |
|---|---|---|---|---|---|
| Impurity | Carbon 1 | Carbon 2 | Carbon 3 | Carbon 4 | Carbon 5 |
| Na | ND* | ND | ND | 353.100 | ND |
| Mg | ND | ND | ND | 139.000 | ND |
| Al | ND | ND | ND | 63.850 | 38.941 |
| Si | ND | ND | ND | 34.670 | 513.517 |
| P | ND | ND | ND | ND | 59.852 |
| S | 12.191 | 10.390 | 18.971 | 90.110 | 113.504 |
| Cl | ND | ND | ND | 28.230 | 9.126 |
| K | ND | ND | ND | 44.210 | 76.953 |
| Ca | 10.651 | 3.071 | 16.571 | ND | 119.804 |
| Cr | ND | ND | ND | 4.310 | 3.744 |
| Mn | ND | ND | ND | ND | 7.552 |
| Fe | 2.672 | 2.144 | 3.140 | 3.115 | 59.212 |
| Ni | ND | ND | ND | 36.620 | 2.831 |
| Cu | ND | ND | ND | 7.927 | 17.011 |
| Zn | ND | ND | ND | ND | 2.151 |
| Total | 25.514 | 15.605 | 38.682 | 805.142 | 1024.198 |
| (% Ash) | (0.006) | (0.003) | (0.009) | (0.13) | (0.16) |

*ND = not detected by PIXE analysis

Example 6

Preparation and Properties of Various Carbon Samples

As noted above, the disclosed carbon materials comprise a higher density through optimization of the micropore and mesopore structure. Specifically, the carbon material exhibits two regions of pore structures (1) micropores, <20 Å, (2) mesopores between 20 Å and 200 Å. There is a relative lack of pore structure between these two populations, and a relative lack of pore structure above 200 Å. High pulse power EDLC systems require low resistance performance from carbon electrodes and from the total cell system. This high pulse power performance electrode carbon is characterized by fast response time as measured using impedance spectroscopy. The fast response time is attributed to purity and pore volume that provide high ion mobility and low ion resistance within the porous structure.

Figure 3:
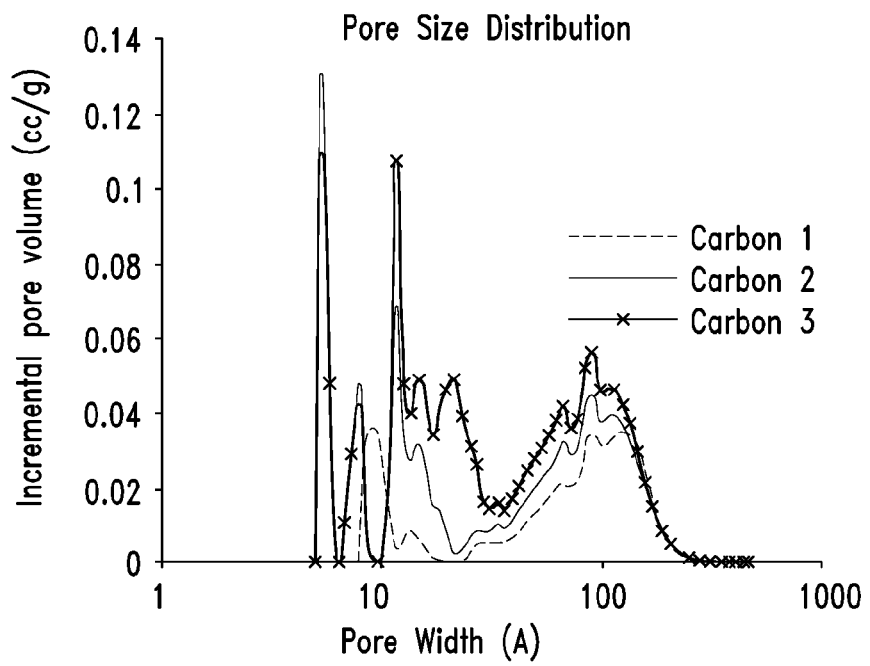
FIG. 3 is an overlay of pore size distribution by incremental pore volume of 3 carbon materials according to the present disclosure.

To demonstrate the utility of the carbon materials, various carbon samples were prepared by following the general procedures described in Examples 1-4. The physiochemical properties of three different types of carbon samples (Carbons 1-3) prepared according to the above procedures are tabulated in Table 1 below. The pore size distribution of the carbon samples is depicted in FIG. 3.

TABLE 1

Physiochemical Characteristics of Carbons 1-3

| Sample | SSA ($m^2/g$) | Total Pore Volume (cc/g) | Tap Density (g/cc) | Ratio $N_2$ adsorbed (P/Po)95/(P/Po)5 | PV meso/ PV total (%) | Purity |
|---|---|---|---|---|---|---|
| Carbon 1 | 600-800 | 0.6-0.8 | 0.35-0.45 | 2.5-3.5 | 70-80%* | <200 ppm impurities Ash <0.1% |
| Carbon 2 | 1550-2100 | 1.2-1.6 | 0.25-0.35 | 2.0-2.5 | 52-60% | <200 ppm impurities Ash <0.1% |

TABLE 1-continued

Physiochemical Characteristics of Carbons 1-3

| Sample | SSA ($m^2/g$) | Total Pore Volume (cc/g) | Tap Density (g/cc) | Ratio $N_2$ adsorbed (P/Po)95/(P/Po)5 | PV meso/ PV total (%) | Purity |
|---|---|---|---|---|---|---|
| Carbon 3 | 2100-2800 | 1.5-2.7 | 0.19-0.28 | 2.0-2.5 | 52-60% | <200 ppm impurities Ash <0.1% |

*Calculation from DFT model on Tristar mesopore analysis as opposed to ASAP2020 micropore analysis for Carbon 2 & 3.

Example 7

Electrochemical Properties of Various Carbon Samples

The carbon samples were analyzed for their electrochemical performance, specifically as an electrode material in EDLC coin cell devices. Specific details regarding fabrication of electrodes, EDLCs and their testing are described below.

Capacitor electrodes comprised 99 parts by weight carbon particles (average particle size 5-15 microns) and 1 part by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte comprising 1.8 M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

When complete, the capacitor was ready for electrical testing with a potentiostat/function generator/frequency response analyzer. Capacitance was measured by a constant current discharge method, comprising applying a current pulse for a known duration and measuring the resulting voltage profile. By choosing a given time and ending voltage, the capacitance was calculated from the following C=It/ΔV, where C=capacitance, I=current, t=time to reached the desired voltage and ΔV=the voltage difference between the initial and final voltages. The specific capacitance based on the weight and volume of the two carbon electrodes was obtained by dividing the capacitance by the weight and volume respectively. This data is reported in Table 11 for discharge between 2.7 and 1.89V.

The data in Table 2 shows that the carbons of this disclosure demonstrate high power with improved volumetric capacitance over a commercially available carbon that was deemed not viable for market due to its low density capacitance, but noted for its high turn on frequency character—a character expanded by carbons of this disclosure to both exhibit higher turn on frequency characteristics and higher volumetric capacitance performance.

TABLE 2

Electrochemical Characteristics of Certain Carbon Materials

| Sample | Gravimetric Capacitance (F/g) (@ 0.5 A/g) | Volumetric Capacitance (F/cc) (@ 0.5 A/g) | Volumetric Power (W/cc) | Gravimetric Power (W/g) |
|---|---|---|---|---|
| Carbon 2 | 105-120 | 12-17 | 4-10 | 8-15 |
| Carbon 3 | 115-125 | 10-14 | 6-10 | 15-30 |
| Commercial Carbon A** | 105** | 7.5 | 2 | 7.8 |

**Measured in 2.0 V (see Example 10)

Carbon 2 was measured for stability testing at 2.7 voltage hold at 65° C. from zero to 128 hours. The higher stability nature of this carbon is depicted in Table 3 as a high capacitance retention over stress testing compared to two commercially available carbon materials (Commercial carbons B and C) used as industry standard stable carbon in EDLC applications. Carbon 4 is predominantly microporous carbon (see curve denoted "NC2-1D" in FIG. 7).

TABLE 3

Electrochemical Stability as a function of % Capacitance Retention over Time

| | Capacitance % Retention of F/cc at 0.5 A/g, 2.7 V hold at 65° C. after several time points (0-128 h) | | | |
|---|---|---|---|---|
| Sample | t = 0 h (%) | t = 24 h (%) | t = 48 h (%) | t = 128 h (%) |
| Carbon 2 | 100 | 89.9 | 87.5 | 82.2 |
| Carbon 4 | 100 | 84.6 | 79.3 | 68.3 |
| Commercial Carbon B | 100 | 90.9 | 84.9 | 63.0 |
| Commercial Carbon C | 100 | 89.3 | 85.4 | 75.3 |

Figure 4:
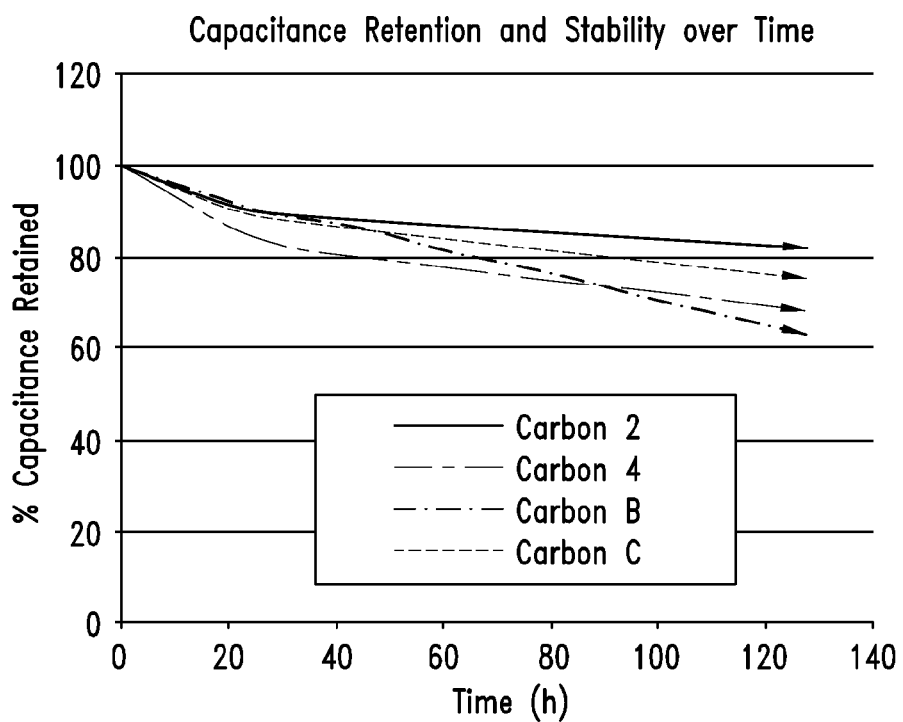
FIG. 4 demonstrates capacitance retention and stability over time for various carbon materials.

Graphically, FIG. 4 shows that Carbon 2 exhibits higher stability at 128 hours compared to carbons 4 and carbons B and C and extrapolation in the charted trend points towards this carbon being a higher stability carbon than other carbons in Table 3.

Figure 5A:
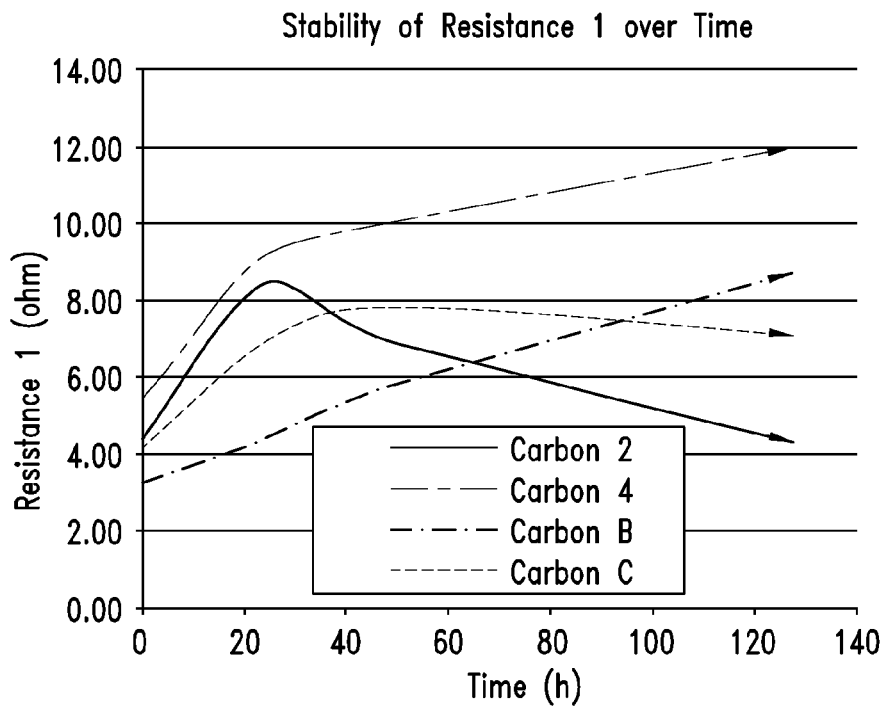
FIGS. 5A and 5 show B resistance of various carbon materials over time.
Figure 5B:
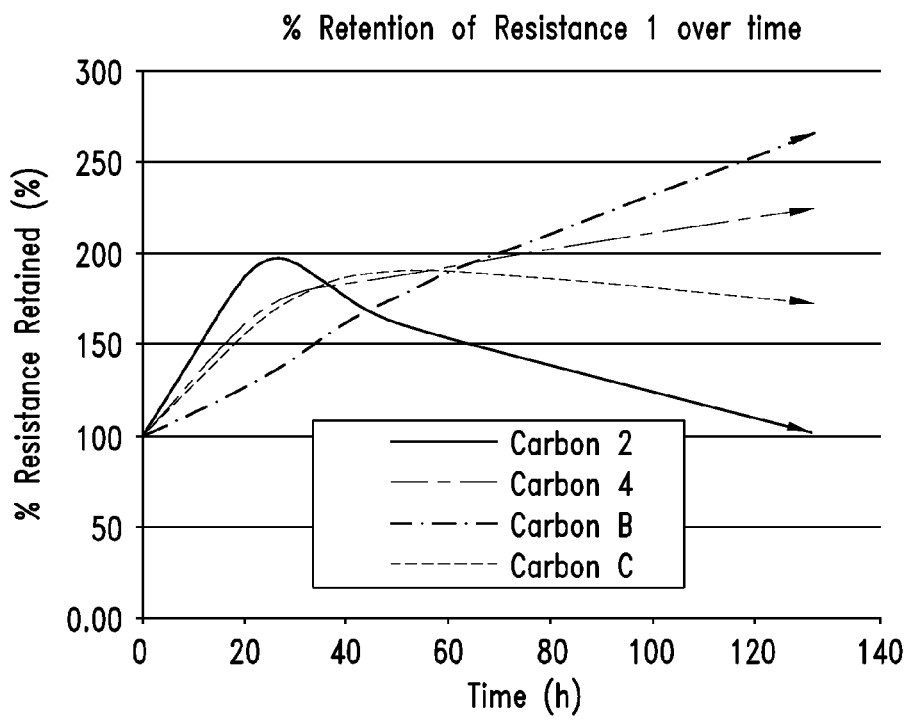

Resistance directly relates to power calculations. The lower the resistance, the higher the power performance. Resistance 1 refers to direct current discharge initial IR drop calculation. This is shown in FIGS. 5A and 5B for various carbon materials.

Stress testing showed that the resistances of Carbon 2 over time remain low, which is a contrast to other carbons in Table 3. Low resistance directly relates to higher power performance.

Figure 6:
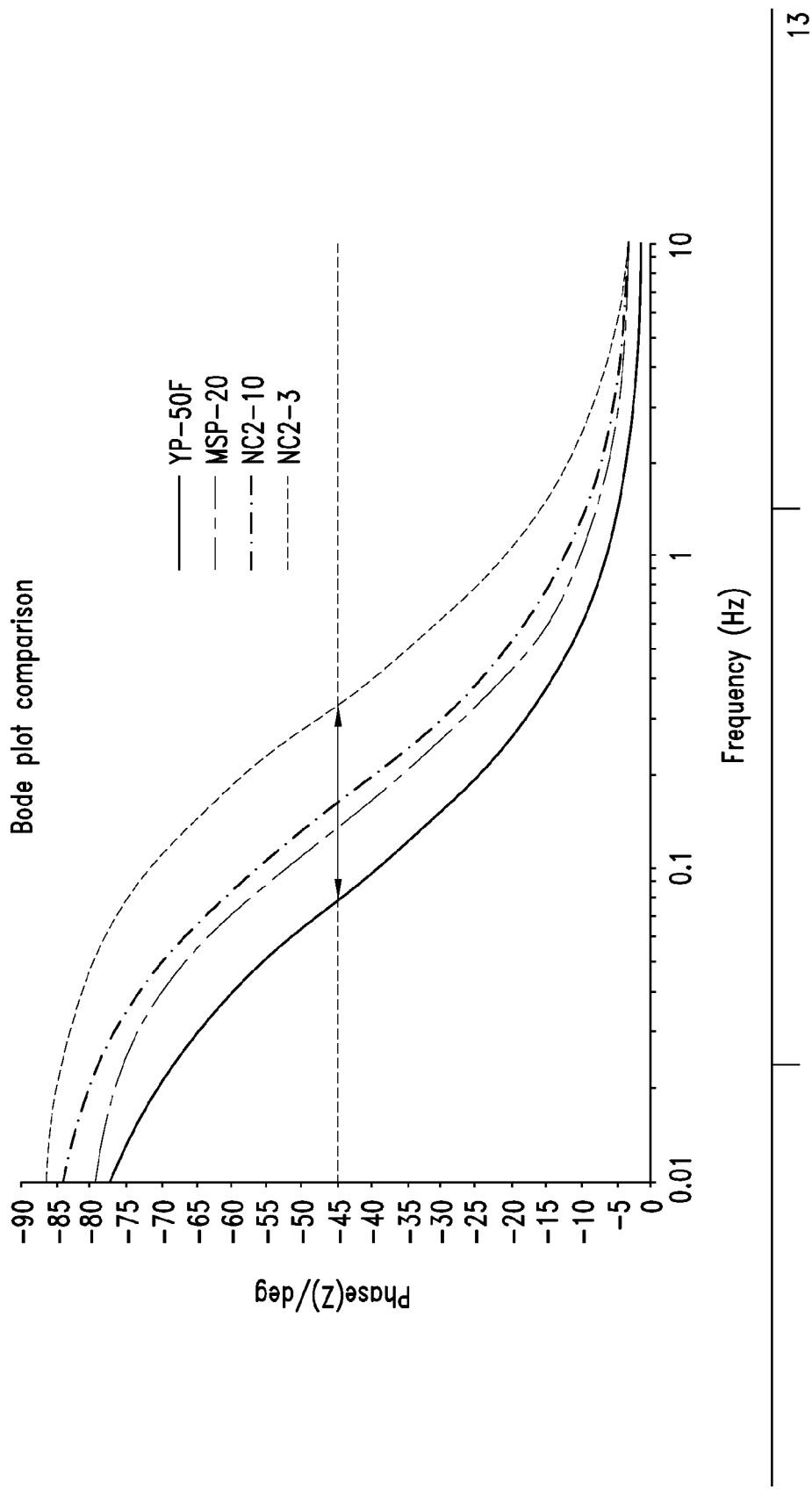
FIG. 6 is a Bode plot comparison of various carbon materials.

A Bode plot (FIG. 6) was generated to depict the high frequency response of typical of the disclosed carbon materials. In this plot, Carbon 2 is designated NC2-3. The shift to the right and higher frequency range on the Bode plot indicates higher frequency response and power performance.

Figure 7:
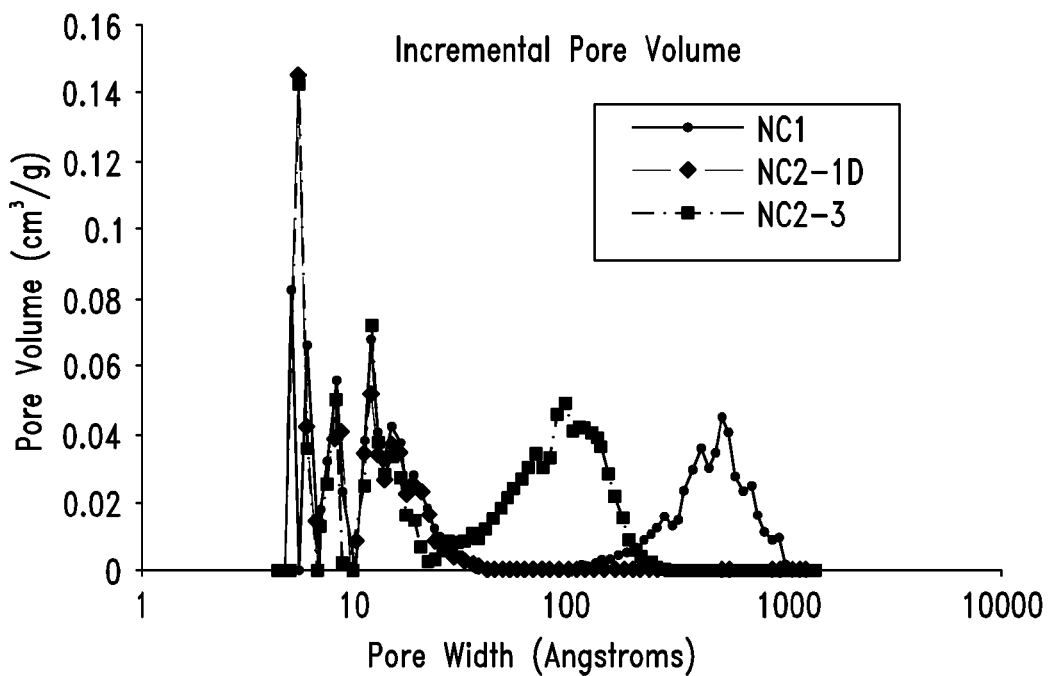
FIG. 7 shows pore size distribution of various carbon materials.

FIG. 7 shows how NC2-3 occupies a unique range of pore size distribution compared to two comparator carbons.

Example 8

Electrochemical Properties of Other Carbon Samples

Another carbon sample (Carbon 2) was prepared according to the general procedures described in the Examples. EDLC coin cells comprising the carbon material were prepared and their electrochemical properties analyzed using 1M TEABF$_4$/ACN electrolyte. The results are tabulated in Tables 4, 5 and 6 below.

TABLE 4

Capacitance and Current Density of Carbon 2

|  | Current density | | | |
| --- | --- | --- | --- | --- |
|  | 0.5 A/g | 1 A/g | 4 A/g | 8 A/g |
| Capacitance (F/cc) | 13.8 | 13.5 | 11.6 | 9.2 |
| Capacitance (F/g) | 113.1 | 110.4 | 94.7 | 75.6 |

Table 5 summarizes the resistance data for Carbon 2. Resistance 1 refers to direct current discharge initial IR drop calculation method. Resistance 2 refers to direct current discharge final voltage relaxation calculation method. Resistance 3 refers to ESR taken at 2V EIS curve at reactance intercept which usually occurs near 400 kHz for the coin cells.

TABLE 5

Resistance of the Carbon 2 Material

|  | Current density | | | |
| --- | --- | --- | --- | --- |
|  | 0.5 A/g | 1 A/g | 4 A/g | 8 A/g |
| Resistance 1 (ohm) | 4.0 | 3.8 | 3.1 | 2.7 |
| Resistance 2 (ohm) | 5.0 | 4.8 | 4.3 | 4.4 |
| Resistance 3 (ohm) | 0.53 | | | |

Table 6 summarizes the power data for EDLCs comprising the carbon material. This power data is calculated from 2V EIS curve. Power number calculated from −45 deg phase angle.

TABLE 6

Power Data for the Carbon 2 Material

|  | Power density (W/cc) | Power density (W/g) FOM |
| --- | --- | --- |
| Power value | 5.0 | 10.3 |

Example 9

Properties of Other Carbon Samples

Additional carbon samples were prepared according to the general procedures described above.

TABLE 7

Electrochemical Data for the Carbon Materials

| Sample | Gravimetric Capacitance (F/g) | Volumetric Capacitance (F/cc) | Gravimetric Power (W/g) |
| --- | --- | --- | --- |
| 5 | 118 | 12 | 57 |
| 6 | 127 | 11 | 61 |

TABLE 8

Physical Properties for the Carbon Materials

| Sample | Specific Surface Area (m$^2$/g) | Total Pore Volume (cc/g) |
| --- | --- | --- |
| 7 | 2113 | 2.03 |
| 8 | 1989 | 1.57 |

Figure 8:
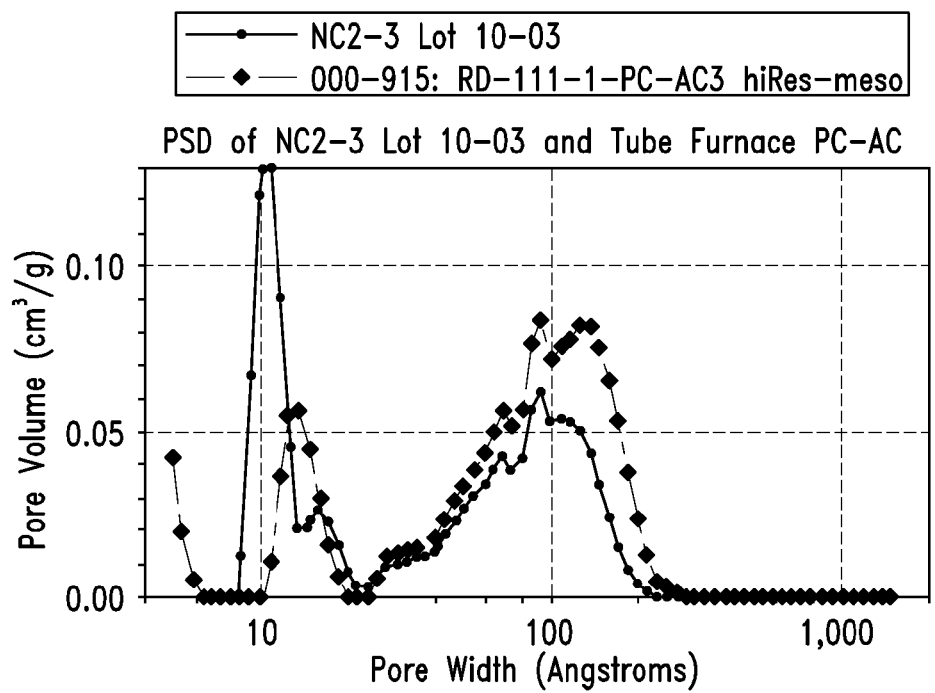
FIG. 8 shows two different batches of carbon material according to the present disclosure.
Figure 9:
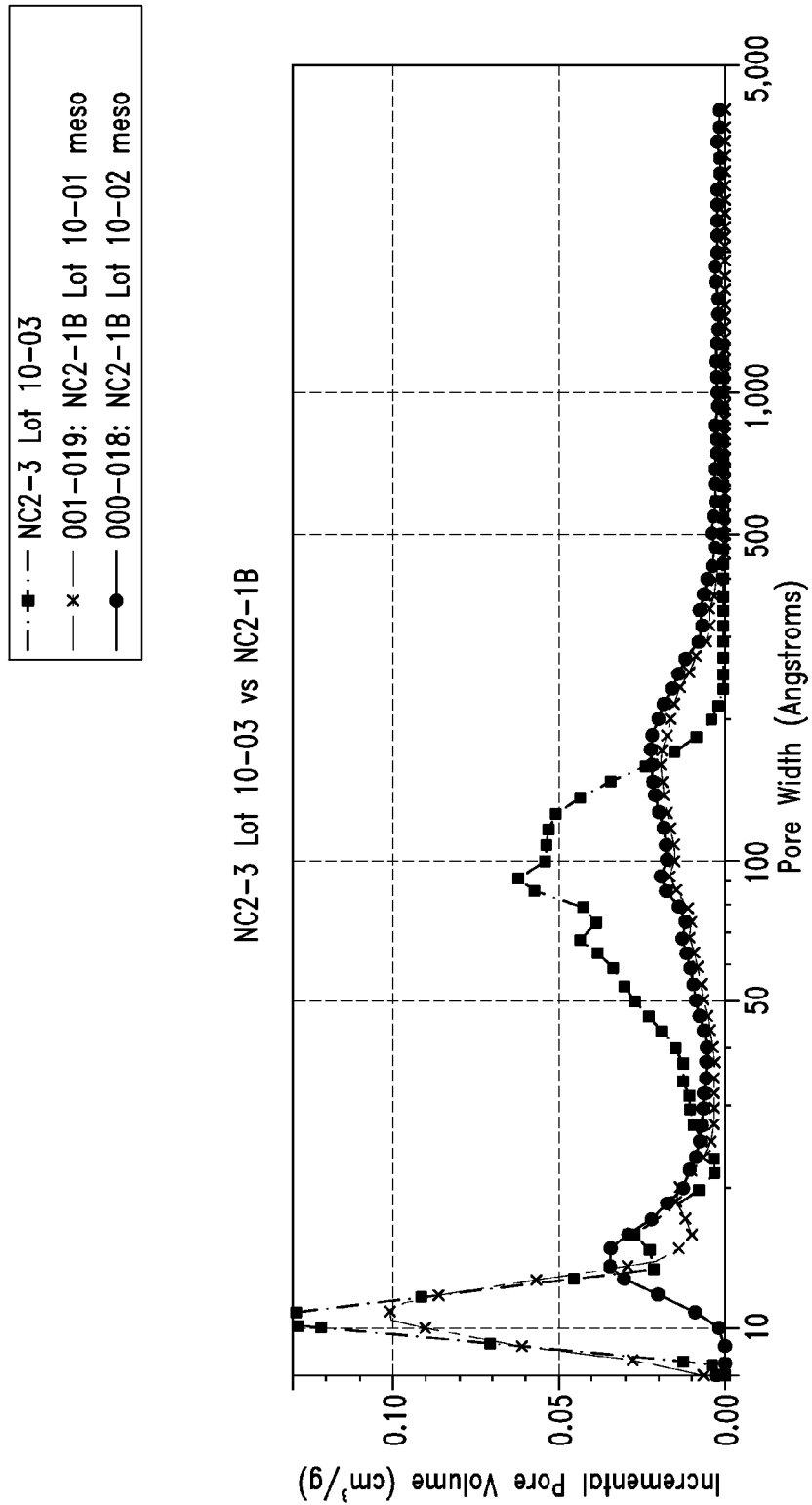
FIG. 9 is an overlay of the pore size distribution of various carbon materials.

The pore size distribution of these carbon samples is shown in FIGS. 8 and 9. FIG. 8 shows that two different batches of carbon material exhibit similar pore structure, while FIG. 9 shows that the carbon materials according to the present disclosure comprise a high volume of mesopore compared to other known carbon materials. Without being bound by theory, Applicants believe this mesoporosity contributes, at least in part, to the enhanced electrochemical properties of the carbon materials.

Example 10

Properties and Performance of Capacitor Electrodes Comprising the Carbon Materials A carbon material prepared according to the general procedures described above was evaluated for its properties and performance as an electrode in a symmetric electrochemical capacitor with a carbonate-based organic electrolyte. A comprehensive set of property and performance measurements was performed on test capacitors fabricated with this material.

The sample was very granular and included relatively large particles. As a result, the capacitor's electrodes formed for the evaluation were porous and had very low density (0.29 g/cm$^3$). The electrode fabricated using the carbon material exhibited a high value of specific capacitance (105 F/g) but because of the very low electrode density the volumetric capacitance was only 30 F/cc. Using the mass or volume of the dry electrodes only, the test devices had Figure of Merit (FOM) values (see Miller, "Pulse Power Performance of Electrochemical Capacitors: Technical Status of Present Commercial Devices," Proc. 8th International Seminar on Double Layer Capacitors and Similar Energy Storage Devices, Deerfield Beach, Fla. (Dec. 7-9, 1998)) around 7.8 W/g and 2 W/ml for operation at 2 V. These values would be reduced by packaging with electrolyte but increased by operation at higher voltages. In comparison, the maximum reported FOM value for commercial capacitor products using organic electrolyte (1998) was 3.6 W/g and 4.1 W/ml. The disclosed carbon material compares very favorably to the commercial devices on a weight basis, primarily because of the relatively high "turn-on" frequency (0.17 Hz). It is anticipated that the volumetric performance of the carbon materials can be improved by reducing the particle size by grinding or other processing.

The carbon sample was labeled 9AC16. The sample was dried at 60° C. then mixed with a Teflon binder at 3.0% by weight. This mixture was thoroughly blended and formed into 0.003"-thick-electrodes. The sample appeared to have a significant fraction of larger particles which led to a porous and low density electrode. In some instances, 0.002" thick electrodes are used for evaluation but the sample could not be formed into this thin a sheet with the integrity required for subsequent handling, and thus, the thicker electrodes were prepared. The sheet material was punched using a steel die to make discs 0.625" in diameter. Four electrode discs of each material were weighed to an accuracy of 0.1 mg. The average mass and density of a pair of electrodes is shown in Table 9.

TABLE 9

Electrode masses and volumes for test capacitors fabricated using the Carbon Materials.

| ID | Average mass of two electrodes (mg) | Combined thickness of two electrodes (inches) | Volume of two electrodes (cm$^3$) | Electrode Density (g/cm$^3$) |
|---|---|---|---|---|
| 9AC16 | 8.7 | 0.006 | 0.003 | 0.29 |

The electrodes were dried under vacuum conditions (mechanical roughing pump) at 195° C. for 14 hours as the last preparation step.

After cooling, the vacuum container containing the electrodes (still under vacuum) was transferred into the drybox. All subsequent assembly work was performed in the drybox. The electrode discs were soaked in the organic electrolyte for 10 minutes then assembled into cells. The electrolyte was an equal volume mixture of propylene carbonate (PC) and dimethylcarbonate (DMC) that contained 1.0 M of tetraethylammoniumtetrafluoroborate (TEATFB) salt.

Two layers of an open cell foam type separator material were used to prepare the test cells. The double separator was ~0.004" thick before it is compressed in the test cell. Initially test cells were fabricated using the normal single layer of separator but these cells had high leakage currents, presumably because of particulates in the electrodes piercing the thin separator. The conductive faceplates of the test cell were aluminum metal with a special surface treatment to prevent oxidation (as used in the lithium-ion battery industry). The thermoplastic edge seal material was selected for electrolyte compatibility and low moisture permeability and applied using an impulse heat sealer located directly within the drybox.

Figure 10:
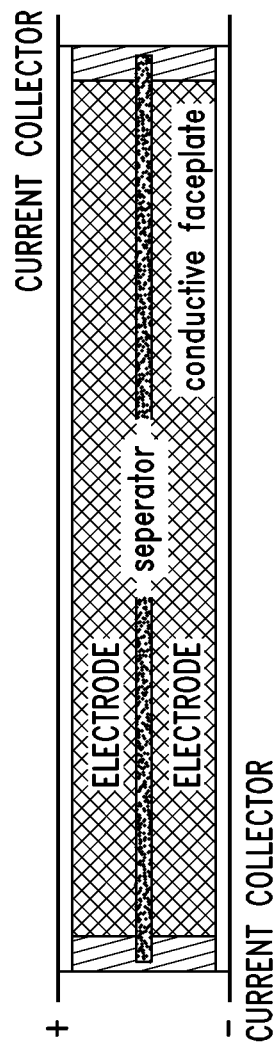
FIG. 10 illustrates a prototype capacitor cell constructed to test the carbon materials.

Two substantially identical test cells were fabricated. The assembled cells were removed from the drybox for testing. Metal plates were clamped against each conductive face-plate and used as current collectors. The cross section of the assembled device is shown in FIG. 10. The electrodes were each 0.003" thick, and the separator 0.004" thick (a double layer of 0.002" thick material). Electrodes had a diameter of 0.625". Capacitor cells were conditioned at 1.0 V for ten minutes, measured for properties, then conditioned at 2.0 V for 10 minutes and measured for properties.

The following test equipment was used for testing the capacitor cells:

1. Frequency Response Analyzer (FRA), Solartron model 1250 Potentiostat/Galvanostat, PAR 273
2. Digital Multimeter, Keithley Model 197
3. Capacitance test box S/N 005, 500 ohm setting
4. RCL Meter, Philips PM6303
5. Power Supply, Hewlett-Packard Model E3610A
6. Balance, Mettler H10
7. Micrometer, Brown/Sharp
8. Leakage current apparatus
9. Battery/capacitor tester, Arbin Model EVTS All measurements were performed at room temperature. The test capacitors were conditioned at 1.0 V then shorted and the following measurements were made: 1 kHz equivalent series resistance (ESR) using the RCL meter, charging capacitance at 1.0 V with a 500 ohm series resistance using the capacitance test box, leakage current at 0.5 and 1.0 V after 30 minutes using the leakage current apparatus, and electrochemical impedance spectroscopy (EIS) measurements using the electrochemical interface and FRA at 1.0 V bias voltage. Then the test capacitors were conditioned at 2.0 V then shorted and the following measurements were made: 1 kHz equivalent series resistance (ESR) using the RCL meter, charging capacitance at 2.0 V with a 500 ohm series resistance, leakage current at 1.5 and 2.0 V after 30 minutes using the leakage current apparatus, and EIS measurements at 2.0 V bias voltage. Finally charge/discharge measurements were made using the Arbin. These measurements included constant current charge/discharge cycles between 0.1 and 2.0 V at currents of 1, 5, and 15 mA and constant current charge/constant power discharges between 2.0 V and 0.5 V at power levels from 0.01 W to 0.2 W.

Tables 10 and 11 list test data for the capacitors fabricated with organic electrolyte. The two samples are almost identical in their charge storage properties, though they vary somewhat in density.

TABLE 10

Test results of two substantially identical prototype capacitors constructed with the disclosed carbon materials. Test capacitors #1 and #2 (data not shown) were fabricated with one layer of separator and were unsuitable for testing because of high leakage currents.

| ID | 1 kHz ESR (Ω) | @ 1.0 V C500 (F) | 30 min leakage current (μA) | |
|---|---|---|---|---|
| | | | 0.5 V | 1.0 V |
| 9AC16 #3 | 3.457 | 0.21 | 1.7 | 7.4 |
| 9AC16 #4 | 3.558 | 0.20 | 5.1 | 15.0 |

C500 - 500 Ω charging capacitance

TABLE 11

Test results after initial 1.0 V measurements of prototype capacitors constructed with the disclosed carbon material. Specific capacitance is on a dry-weight basis.

| ID | 1 kHz ESR (Ω) | @ 2.0 V C500 (F) | 30 min leakage current (μA) 1.5 V | 2.0 V | F/g @ 2.0 V | F/cc @ 2.0 V |
|---|---|---|---|---|---|---|
| 9AC16 #3 | 3.296 | 0.23 | 11.8 | 53 | 106 | 30 |
| 9AC16 #4 | 3.522 | 0.22 | 23.7 | 70 | 102 | 29 |

C500 - 500 Ω charging capacitance

Figure 11:
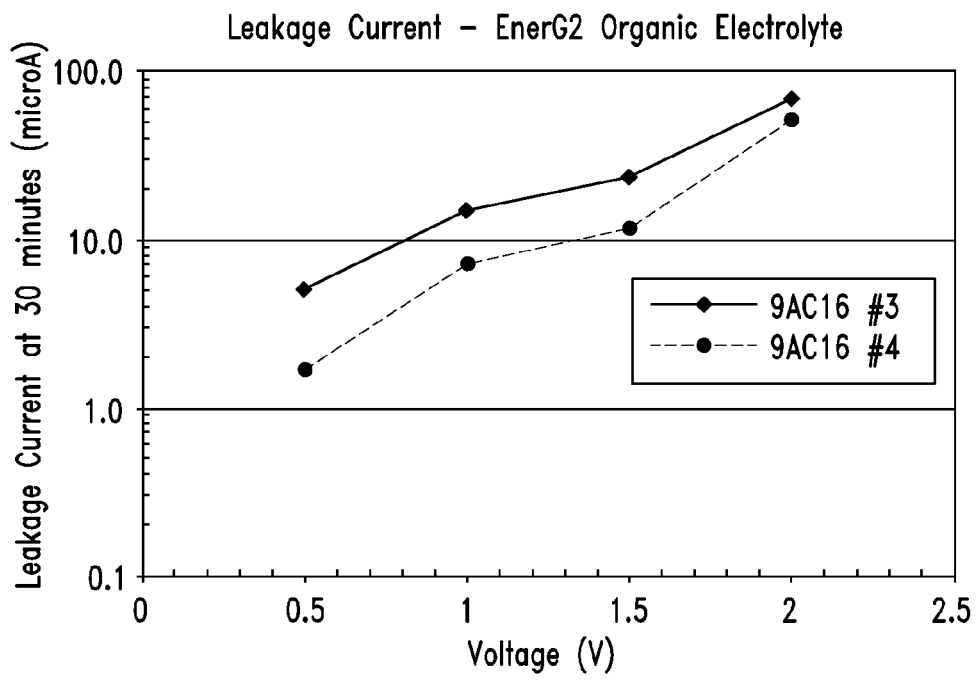
FIG. 11 depicts 30 minute leakage current values at four different voltages for the two test capacitors.
Figure 12:
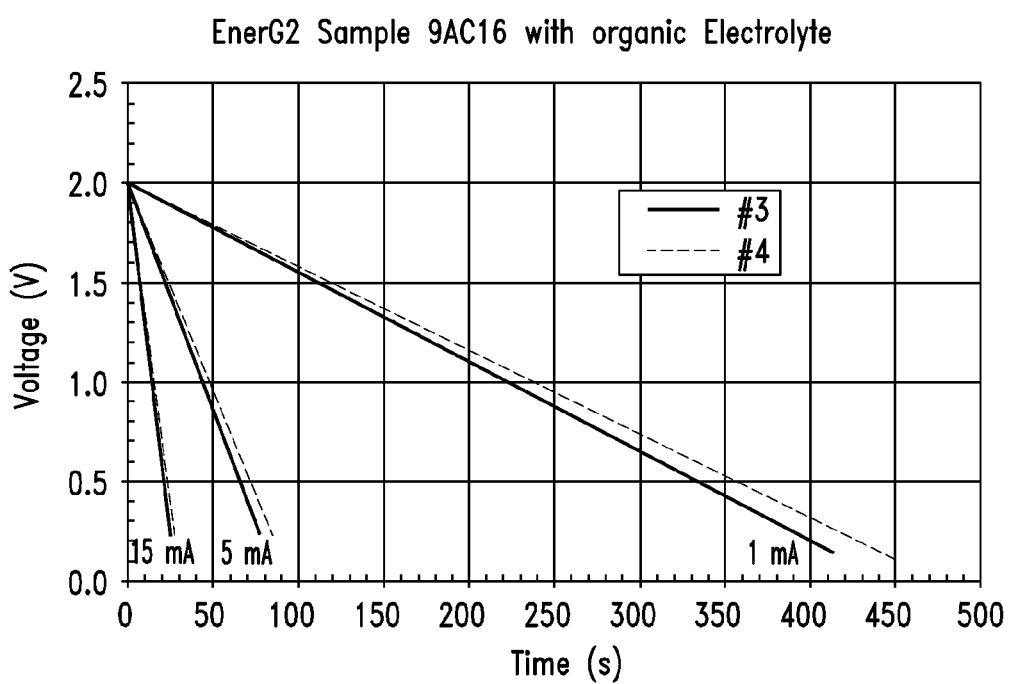
FIG. 12 is a graph of constant current discharges of the prototype capacitors containing the disclosed carbon material.

FIG. 11 shows 30 minute leakage current values at four different voltages for the two test capacitors. A log-linear relationship between voltage and leakage current is typical for electrochemical capacitors and occurs when leakage current is dominated by charge transfer reactions associated with impurities. The test capacitors exhibit close to a log-linear relationship between leakage current and voltage. This relationship is typical for electrochemical capacitors and occurs when leakage current is charge transfer reactions associated with impurities. The leakage current values are within the normal range typically measured for carbon electrode samples FIG. 12 shows constant current discharge behavior of the capacitors containing the disclosed carbon materials when discharged at three current values. The discharge rate at 5 mA corresponds to a current density of ~2.5 mA/cm².

Figure 13A:
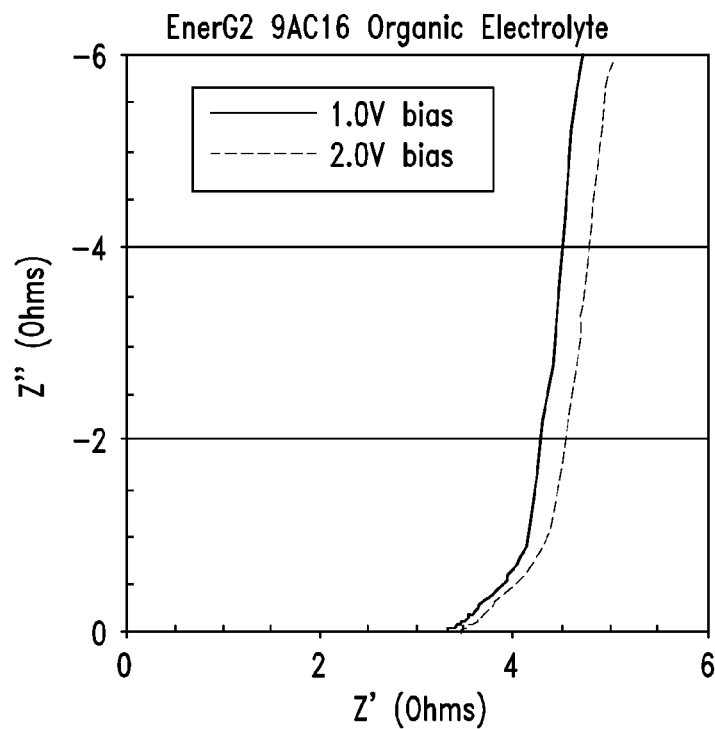
FIG. 13A is a complex plane representation of impedance data from the capacitor fabricated using the disclosed carbon material and organic electrolyte.

FIG. 13a shows impedance data in a complex-plane representation for a test capacitor at voltages of 1.0 and 2.0 V. The behavior is very similar at both bias voltages. There is essentially no voltage dependence to the response, which is expected. An ideal RC circuit would be represented by a straight vertical line that intersects the real axis at the value of the resistance. Shown is an intersection with the real axis at ~3.3Ω. The line rises for a short distance at an angle of ~45 degrees. This type behavior is seen in devices having porous electrodes, and may be due to distributed charge storage. After that the lines are not quite vertical, which is usually due to a parallel charging path such as a leakage current. Nevertheless, the non-ideal characteristics are very minor for this sample.

Figure 13B:
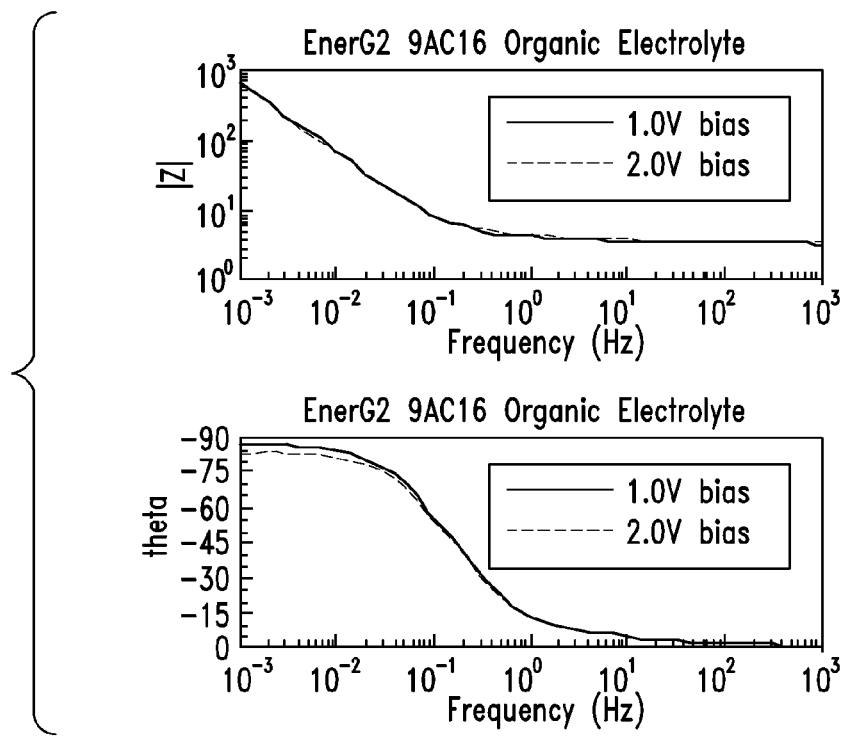
FIG. 13B is a Bode representation of impedance data for the capacitor containing the disclosed carbon material and organic electrolyte.

FIG. 13b shows the same impedance data in a Bode representation, which is the magnitude of the impedance |Z| and the phase angle versus frequency. Capacitive behavior is evident by the −1 slope at lower frequencies and the phase angles approaching −90 degrees. Note the phase angle is close to zero at high frequencies and approaches −90 degrees at low frequencies.

Figure 13C:
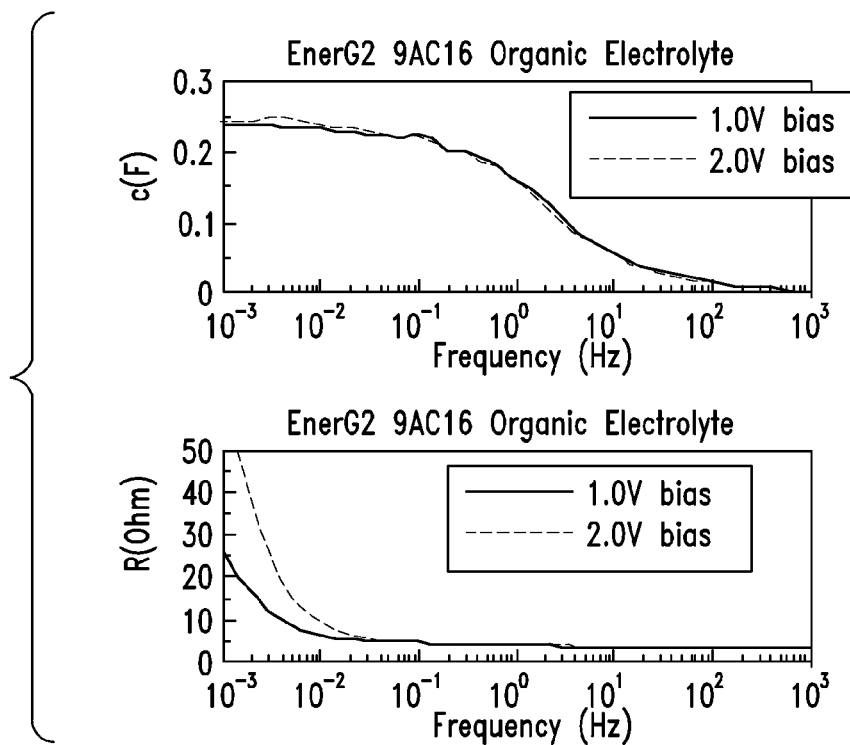
FIG. 13C presents impedance data represented as a series-RC circuit.

FIG. 13c shows the same data in yet another representation—assuming the device can be represented by a series-RC circuit. The capacitance is calculated as $-1/(2\pi f Z'')$, where f is the frequency in Hz, Z'' is the reactance, and $\pi=3.1415$. As shown, the capacitance increases from a minimum at ~200 Hz in a monotonic fashion as the frequency is reduced, reaching saturation of ~0.24-0.25 F at frequencies below ~0.1 Hz. The series resistance has a minimum value at about 1 kHz and increases as the frequency is reduced. This type behavior is characteristic of a porous electrode, where the resistance increases at low frequencies as charge storage occurs in deeper pores through longer paths of electrolyte.

The frequency at which a −45 degree phase angle is reached at 2.0 V bias is $f_o$~0.17 Hz. The reactance Z" (imaginary part of the impedance) at this frequency is ~−4.7Ω so the calculated capacitance at this frequency, assuming a series-RC circuit, is $C=-1/(2 \pi f_o Z'')$=~0.2 F. Thus at 2.0 V the calculated figure of merit (FOM) values described by Miller ("Pulse Power Performance of Electrochemical Capacitors: Technical Status of Present Commercial Devices," Proc. 8th International Seminar on Double Layer Capacitors and Similar Energy Storage Devices, Deerfield Beach, Fla. (Dec. 7-9, 1998)) are ~7.8 W/g and ~2.2 W/ml. Table 12 lists FOMs for the tested sample material. The larger the FOM values, the more suitable the material for pulse applications.

TABLE 12

Calculated gravimetric and volumetric Figure of Merit (FOM) of the disclosed carbon material in a test sample with organic electrolyte at a voltage of 2.0 V. Mass and volume include that of the two dry electrodes only. Packaged devices are expected to have values reduced by two to four times, depending on product size.

| Sample | $f_o$ = −45 deg. freq. (Hz) | Reactance @ −45° (Ω) | C = 1/(2pi ImZ Hz) (F) | E/M (J/g) | E/V (J/cc) | Gravimetric FOM ((W/g) | Volumetric FOM (W/mL) |
|---|---|---|---|---|---|---|---|
| 9AC16 #3 | 0.17 | −4.70 | 0.203 | 46.6 | 13.4 | 7.8 | 2.2 |

With electrolyte included, mass FOM will drop to about 4 W/g and the volume value will remain unchanged. Packaging mass and volume impact to the FOMs will be greatest for small devices. For instance, a further four-fold reduction in the FOMs is expected for "button" size devices, while a two-fold reduction might result for hybrid vehicle size capacitor modules. FOM values of some commercial products are tabulated in Table 13. The disclosed carbon material compares very favorably to the commercial devices on a weight basis, primarily because of the relatively high "turn-on" frequency (0.17 Hz). It is expected that the volumetric performance can be improved by reducing particle size by grinding or other processing.

TABLE 13

Figure of Merit (FOM) of commercial electrochemical capacitor products at their rated voltages. (This data was obtained from small- and large- size commercial electrochemical capacitors in 1998, see Miller.)

| EC PRODUCT | E/M (J/g) | E/v (J/cm³) | Mass FOM (W/g) | Volume FOM (W/cm³) |
|---|---|---|---|---|
| Powerstor | 1.3 | 1.9 | 2.1 | 3.0 |
| Maxwell PC0323 | 6.2 | 6.9 | 1.0 | 1.1 |
| Maxwell PC7223 | 9.7 | 12.8 | 0.5 | 0.64 |

TABLE 13-continued

Figure of Merit (FOM) of commercial electrochemical capacitor products at their rated voltages. (This data was obtained from small- and large- size commercial electrochemical capacitors in 1998, see Miller.)

| EC PRODUCT | E/M (J/g) | E/v (J/cm$^3$) | Mass FOM (W/g) | Volume FOM (W/cm$^3$) |
|---|---|---|---|---|
| Maxwell PC0223 | 4.5 | 9.9 | 0.5 | 1.1 |
| cap-XX card | 0.047 | 0.062 | 1.3 | 1.7 |
| cap-XX 120 F | 7.4 | 7.0 | 0.74 | 0.7 |
| cap-XX 30 F | 1.3 | 1.3 | 2.7 | 2.7 |
| cap-XX 10 F | 0.54 | 0.61 | 3.6 | 4.1 |
| cap-XX 250 F | 2.2 | 1.6 | 2.2 | 1.6 |
| ELNA | 4.4 | 5.0 | 0.36 | 0.4 |
| Panasonic | 6.7 | 7.2 | 0.34 | 0.37 |
| ELIT 9.4 F | 0.093 | 0.31 | 0.95 | 3.2 |
| ESMA | 2.2 | 4.3 | 0.22 | 0.43 |
| Powercell | 7.3 | 10 | 0.07 | 0.09 |
| ELIT 20 kJ | 1.2 | 2.7 | 0.2 | 0.46 |
| ECOND 8/16/0.8 | 0.68 | 2.1 | 0.09 | 0.27 |
| ECOND 8/16/10 | 0.51 | 1.7 | 0.43 | 1.4 |

Figure 14:
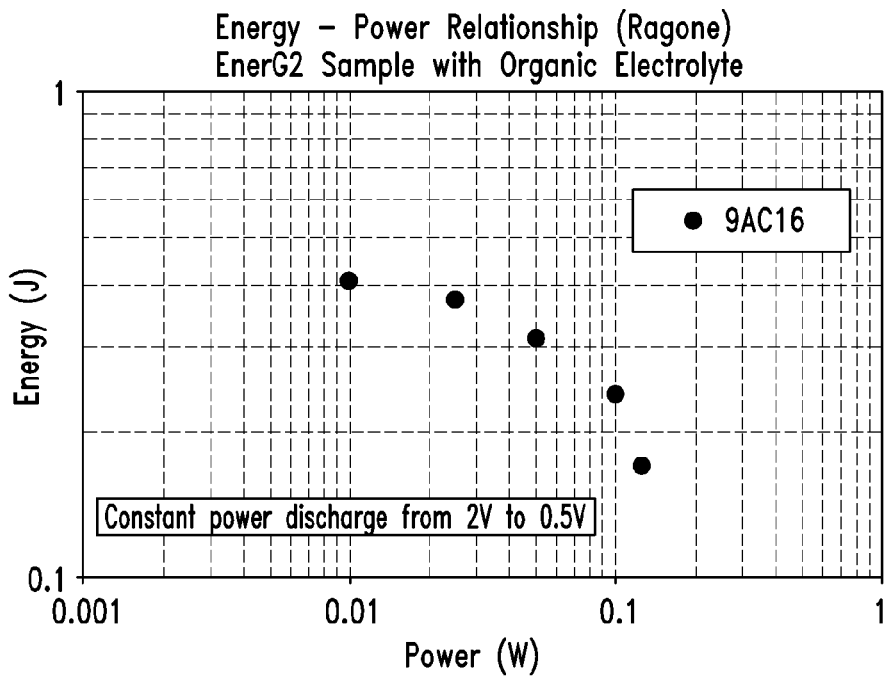
FIG. 14 shows experimentally determined energy—power relationship for a test capacitor fabricated using the disclosed carbon materials and organic electrolyte.

Another way of showing the performance of a capacitor is by showing the energy-power relationship in the Ragone representation as shown in FIG. 14. The energy that can be delivered decreases as the power increases. The energy and power values shown in the figure were determined experimentally with constant power discharges from 2.0 V to 0.5 V. Comparison to commercial devices is difficult because of the unknowns associated with packaging mass and volume and because commercial organic electrolyte capacitors often use acetonitrile and operate at higher voltages.

Example 11

Comparison of Different Methods for Preparing the Carbon Materials

A comparison of different methods for preparation of carbon materials was performed by preparing polymer gels as described above and either flash freezing in liquid nitrogen as described above or freezing more slowly on a freezer shelf. The studies indicate that flash freezing results in a carbon material having higher mesoporosity and superior electrochemical properties. The freeze drying, pyrolysis and activation conditions were as follows:

The polymer gel was ground with a mechanical grater using a 2 mm grinder fitting. The polymer gel was then flash frozen with liquid $N_2$ and shelf frozen at −50° C. After flash freezing, the polymer gel was freeze dried according to the following protocol:
1. Hold at −50° C. and 50 mTorr;
2. Ramp from −50° C. to −30° C. in 30 mins at 50 mTorr;
3. Ramp from −30° C. to +25° C. in 220 mins at 50 mTorr; and
4. Continual 'hold' at +25° C. and 50 mTorr.

After freeze drying, the polymer gel was pyrolyzed in a tube furnace by ramping the temperature up by 5° C. per minute under $N_2$ gas to 900° C., dwelling at 900° C. for 60 minutes under $N_2$ gas and then ramping down to ambient temperature under $N_2$ gas. The pyrolyzed material was then activated in a tube furnace to a target weight loss. The activation parameters can be adjusted to obtain the desired activation result.

Table 14 summarizes dried gel and pyrolyzed carbon characterization from these two methods.

TABLE 14

Dried Gel and Pyrolyzed Carbon Characteristics Based on Preparation Method

| Sample # | Process Conditions | Weight Loss (%) | SSA (m$^2$/g) | Total Pore Volume (cc/g) | Tap Density (g/cc) |
|---|---|---|---|---|---|
| RD-111-1-DG | Freezing Method Liq $N_2$ | 73.4 | 753 | 1.40 | 0.22 |
| RD-111-2-DG | Freezing Method Shelf Freeze | 73.1 | 578 | 0.43 | 0.45 |
| RD-111-1-PC | Pyrolysis 60 mins @ 900° C. | 50.5 | 786 | 0.94 | 0.32 |
| RD-111-2-PC | Pyrolysis 60 mins @ 900° C. | 49.7 | 664 | 0.33 | 0.56 |
| Dried Gel Control (control chart values) | Freezing Method Liq $N_2$ | 66.2 | 609 | 0.58 | 0.43 |

Figure 15:
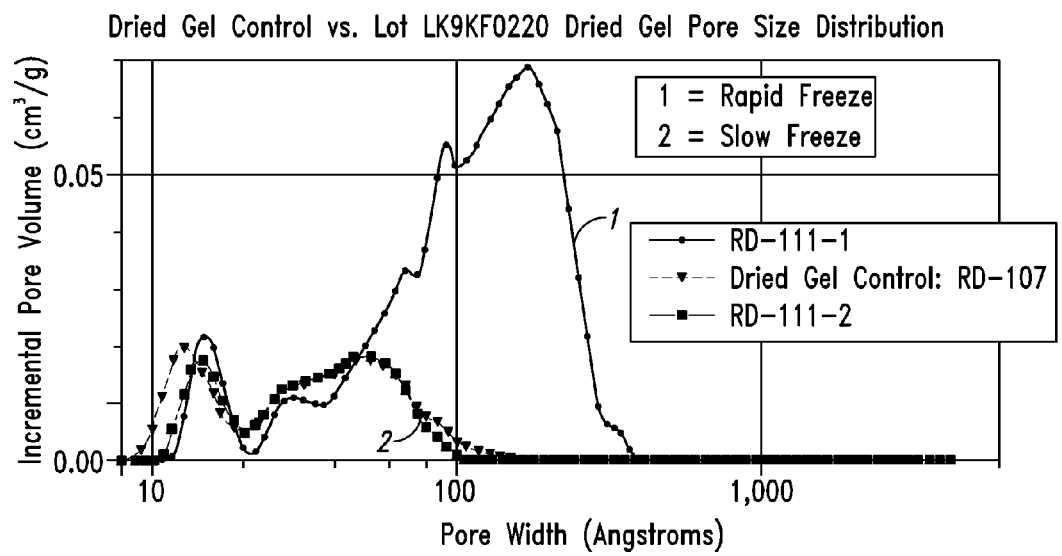
FIG. 15 is an overlay of the pore size distributions of flash frozen or slow frozen dried polymer gels.
Figure 16:
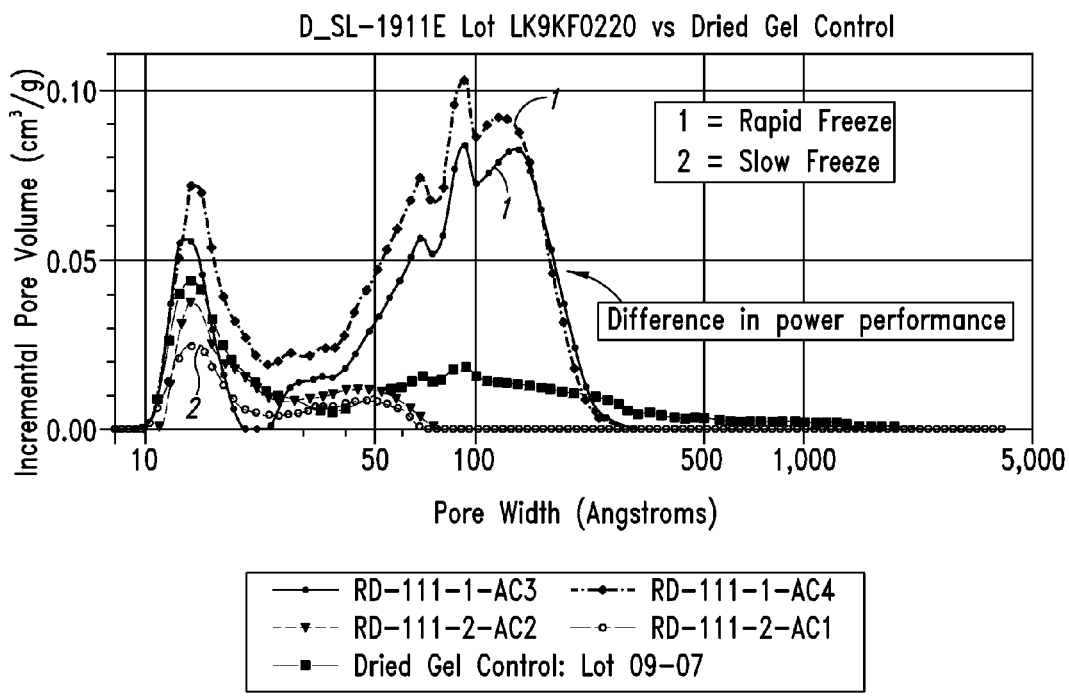
FIG. 16 is an overlay of the pore size distribution of carbon materials prepared from flash frozen or slow frozen dried gels.

FIG. 15 shows that flash frozen polymer gels comprise higher mesoporosity than gels frozen more slowly. The pore size distribution (PSD) trend in the dried gel directly translated to PSD in the activated carbon as depicted in Table 14 and FIG. 16. For example, the flash frozen dried gel also produced activated carbon with high total pore volume (+2.0 cc/g) and lower tap density than the shelf frozen dried gel.

Figure 17:
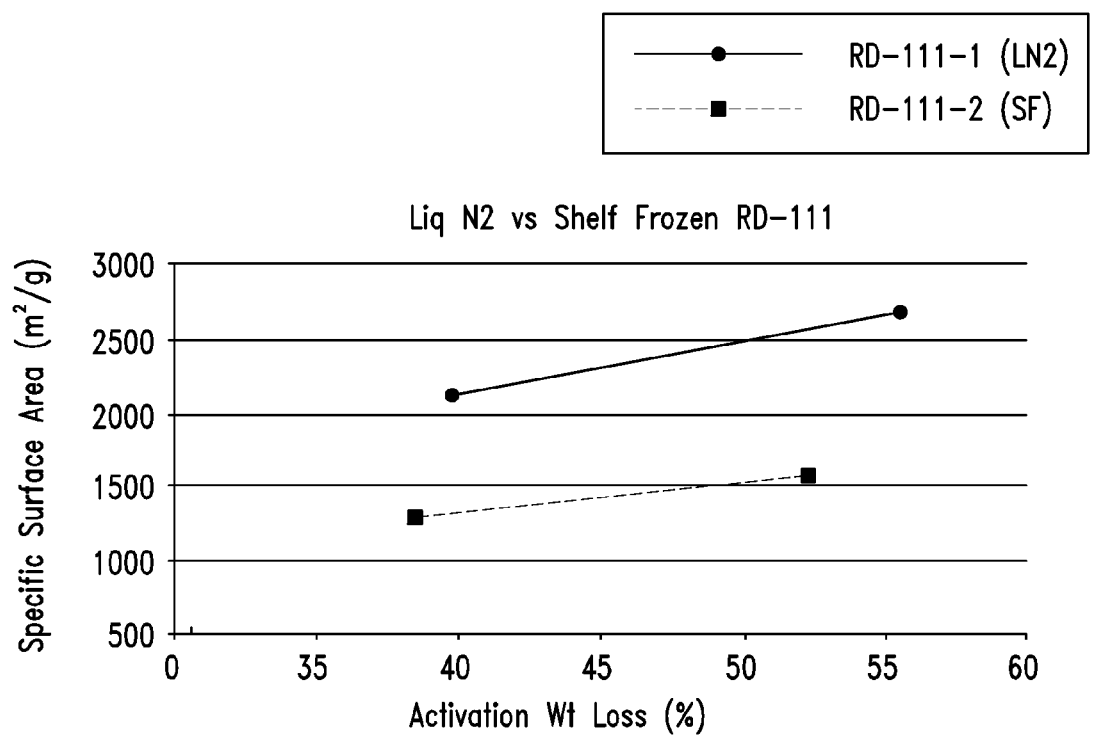
FIG. 17 is a graph showing activation weight loss and surface areas for liquid nitrogen (LN) or shelf frozen (SF) polymer gels.

Liquid nitrogen and shelf frozen dried gels had very similar activation weight loss per time at temperature, but produced very different surface area activated carbons. From Table 2, for the same lower and higher activation parameters, similar weight losses were achieved but different SSA was measured. For example, RD-111-1-AC4 and RD-111-2-AC2 were activated for 74 mins at 950° C. and achieved 55.5% and 52.2% weight loss respectively. The same was found at the lower activation settings of 55 mins at 950° C. (39.8% and 38.5%). However, for the given weight losses, different specific surface areas were attained, FIG. 17.

The carbon materials prepared by slow freezing had lower power performance. While not wishing to be bound by theory, Applicants believe this low power performance can be attributed to the lack of mesopores in these carbon materials. It is also believed that this lack of mesoporosity contributes to the higher tap densities and lower total poor volume of these carbon materials as shown in Table 15

TABLE 15

Properties of Activated Carbons

| Sample # | Freezing Method | Activation Conditions | Activation Wt loss (%) | SSA (m$^2$/g) | Total Pore Volume (cc/g) | Tap Density (g/cc) |
|---|---|---|---|---|---|---|
| RD-111-1-AC1 | Liq. $N_2$ | 10 mins @ 800° C. | 1 | — | — | — |

TABLE 15-continued

Properties of Activated Carbons

| Sample # | Freezing Method | Activation Conditions | Activation Wt loss (%) | SSA (m²/g) | Total Pore Volume (cc/g) | Tap Density (g/cc) |
|---|---|---|---|---|---|---|
| RD-111-1-AC2 | Liq. N₂ | 18 mins @ 800° C. | 1.2 | — | — | — |
| RD-111-1-AC3 | Liq. N₂ | 55 mins @ 950° C. | 39.8 | 2114 | 2.06 | 0.24 |
| RD-111-1-AC4 | Liq. N₂ | 74 mins @ 950° C. | 55.5 | 2684 | 2.50 | 0.17 |
| RD-111-2-AC1 | Shelf Freeze | 55 mins @ 950° C. | 38.5 | 1310 | 0.63 | 0.41 |
| RD-111-2-AC2 | Shelf Freeze | 74 mins @ 950° C. | 52.2 | 1583 | 0.77 | 0.36 |

Example 12

Alternative Preparation of a Carbon Material

A carbon material ("Carbon 9") useful in lead acid battery applications (among others) was prepared according to the following description. A polymer gel was prepared by polymerization of resorcinol and formaldehyde (0.5:1) in a water/acetic acid solvent (80:20) in the presence of ammonium acetate catalyst. The resultant polymer to solvent ratio was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel with a rock crusher through a screen with ¾ inch sized holes. The particles were flash frozen by immersion in liquid nitrogen, loaded into a lyophilization tray at a loading of 3 to 7 g/in², and lyophilized at approximately 50 to 150 mTorr. The time to dry (as inferred from time for product to reach within 2° C. of shelf temperature) varied with product loading on the lyophilizer shelf.

The mass loss on drying the polymer gel was approximately 72%. The surface area of the dried polymer gel was determined to be 691 m²/g, the total pore volume was 1.05 cc/g and the tap density was 0.32 g/cc. Dried polymer gel materials comprising different properties (e.g., surface area, pore structure, etc.) can be prepared by altering the drying conditions (e.g., pressure, temperature, time, etc.) described above.

Dried polymer gel prepared according was pyrolyzed by passage into a rotary kiln at 900° C. with a nitrogen gas flow of 200 L/h. The surface area of the pyrolyzed dried polymer gel was examined by nitrogen surface analysis using a surface area and porosity analyzer. The measured specific surface area using the standard BET approach was 737 m²/g, the total pore volume was 0.64 cc/g. Carbon materials comprising different properties (e.g., surface area, pore structure, etc.) can be prepared by altering the pyrolysis conditions (e.g., temperature, time, etc.) described above.

Figure 18:
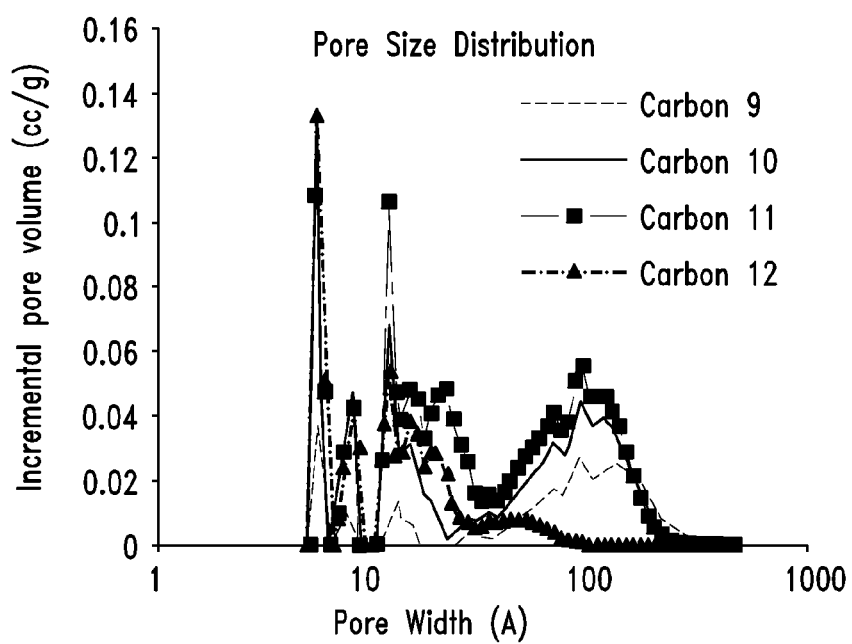
FIG. 18 shows pore size distribution of exemplary carbon samples.

FIG. 18 shows an overlay of the pore size distributions of various carbon materials. Note that the pore size distribution for the activated carbon was measured on a micromeritics ASAP2020, a micropore-capable analyzer with a higher resolution (lower pore size volume detection) than the Tristar 3020 that was used to measure the pore size distribution for the dried polymer gel.

From the DFT cumulative volume plot for the activated carbon material, it was determined that about 40% of the pore volume resides in micropores and about 60% of the pore volume resides in mesopores. Carbon materials comprising different properties (e.g., surface area, pore structure, etc.) can be prepared by altering the activation conditions (e.g., temperature, time, etc.) described above.

Pyrolyzed carbon prepared was jet milled using a manufacturing scale 15 inch diameter jet mill. The average particle size after jet milling was about 4 to 7 microns. Properties of Carbon 1 are summarized in Table 16. Table 17 summarizes the range of properties of various carbon embodiments prepared according the above procedures.

TABLE 16

Physiochemical Properties of Carbon 1

| Test | Parameter | Result |
|---|---|---|
| Tap Density | Tap Density (g/cc) | 0.43 |
| N2 Sorption Isotherm | Specific Surface Area (m²/g) | 737 |
| | Total pore volume (cc/g) | 0.64 |
| | DFT Pore volume >20 Å (cc/g) | 0.38 |
| | $N_2$ $(p/p0)_{95}/(p/po)_5$: 2.0-2.7 (i.e., "P95/P5") | 2.2 |
| Thermal Gravimetric Analysis (TGA) | % weight loss observed between 250 to 850 C. | 1.0 |
| Ash Content | Calculated from PIXE elemental data (%) | 0.0008 |
| PIXE Purity | Sulfur (ppm): | ND |
| | Silicon (ppm): | ND |
| | Calcium (ppm): | ND |
| | Iron (ppm): | 6.2 |
| | Nickel ppm): | 1.1 |
| | Zinc (ppm): | ND |
| | Copper (ppm): | ND |
| | Chromium (ppm): | ND |
| | All other elements: | ND |

ND = not detected

Example 13

Alternative Preparation of a Carbon Material

A carbon material ("Carbon 12") having increased energy density with balanced power performance was prepared according to the following description. A polymer gel was prepared by polymerization of resorcinol and formaldehyde (0.5:1) in a water/acetic acid solvent (80:20) in the presence of ammonium acetate catalyst. The resultant polymer to solvent ratio was 0.3, and the resorcinol to catalyst ratio (R/C)

was 25. The reaction mixture was placed at elevated temperature (incubation at 45° C. for about 6 h followed by incubation at 85° C. for about 24 h) to allow for gellation to create a polymer gel. Polymer gel particles were created from the polymer gel with a rock crusher through a screen with ¾ inch sized holes. The particles were loaded into a lyophilization tray at a loading of 3 to 7 g/in², frozen on the shelf of a freeze-dryer until particles were frozen below −30° C. The frozen particles were lyophilized at approximately 50 mTorr. The time to dry (as inferred from time for product to reach within 2° C. of shelf temperature) varied with product loading on the lyophilizer shelf. At manufacturing scale, polymer gel particles were loaded on lyophilization trays in a −30° C. cold room and frozen over the course of 24 hours. These frozen particles were lyophilized at approximately 120 mTorr. The time to dry (as inferred from time for product to reach within 2° C. of shelf temperature) varied with product loading on the lyophilizer shelf.

Figure 19:
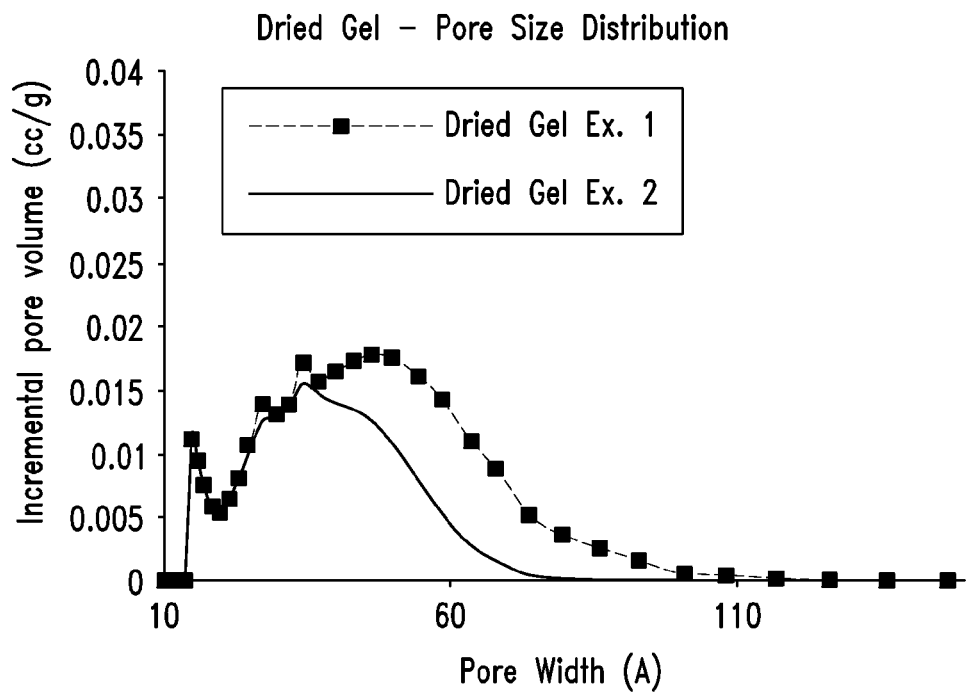
FIG. 19 is a graph showing pore size distribution of dried gel samples.

The mass loss on drying the polymer gel was 74.1%. The surface area of the dried polymer gel was determined to be 515 m²/g, the total pore volume was 0.39 cc/g and the tap density was 0.22 g/cc. The pore size distribution of two different batches of dried polymer gel is shown in FIG. 19 that exhibit a range of physical properties from altering the lyophilization parameters.

Dried polymer gel prepared according to the above procedure was pyrolyzed by passage into a furnace at 625° C. with a nitrogen gas flow of 400 L/h. At manufacturing scale, dried polymer gel prepared according to the above procedure was pyrolyzed by passage into a rotating kiln furnace set with three hot zones of 685° C., 750° C., and 850° C.

The surface area of the pyrolyzed dried polymer gel pyrolyzed by passage into a furnace at 625° C. was examined by nitrogen surface analysis using a surface area and porosity analyzer. The measured specific surface area using the standard BET approach was 622 m²/g, the total pore volume was 0.33 cc/g. The surface area of the pyrolyzed dried polymer gel pyrolyzed by passage into a rotary kiln furnace set with three hot zones of 685° C., 750° C., and 850° C. was examined by nitrogen surface analysis using a surface area and porosity analyzer. The measured specific surface area using the standard BET approach was 588 m²/g, the total pore volume was 0.25 cc/g. Carbon materials comprising different properties (e.g., surface area, pore structure, etc.) can be prepared by altering the pyrolysis conditions (e.g., temperature, time, etc.) described above.

Pyrolyzed carbon material prepared according to above was activated in a batch rotary kiln at 900° C. under $CO_2$ for approximately 840 min, resulting in a total weight loss of 50%. In another case, Pyrolyzed carbon material prepared according to above was activated in a fluidized bed reactor at 925° C. under $CO_2$.

The surface area of the activated carbon produced by a batch rotary kiln as described above was examined by nitrogen surface analysis using a surface area and porosity analyzer. The measured specific surface area using the BET approach was 1857 m²/g, the total pore volume was 0.87 cc/g and the tap density was 0.41 g/cc. In the second case using a fluidized bed reactor, the resultant material was also measured by nitrogen adsorption analysis and the measured specific surface area using the BET approach was 2046 m²/g, and the total pore volume was 1.03 cc/g.

Figure 20:
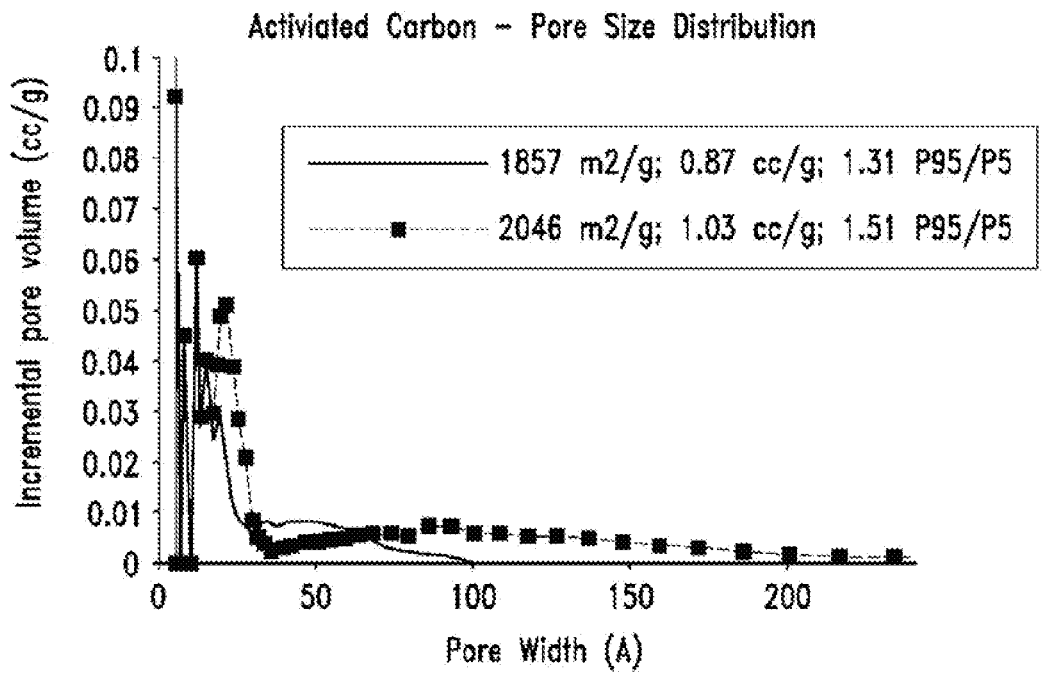
FIG. 20 presents pore size distributions of various carbon samples.

FIG. 20 shows an example of the pore size distributions of the activated carbon material from both the activation conditions described above. Note that the pore size distribution for the activated carbon was measured on a micromeritics ASAP2020, a micropore-capable analyzer with a higher resolution (lower pore size volume detection) than the Tristar 3020 that was used to measure the pore size distribution for the dried polymer gel.

From the DFT cumulative volume plot for the activated carbon material, it was determined that the 80% of the pore volume resides in micropores and 20% of the pore volume resides in mesopores. In the second case of activated carbon materials depicted in FIG. 20, it was determined that 70% of the pore volume resides in the micropores and 30% of the pore volume resides in the mesopores. Carbon materials comprising different properties (e.g., surface area, pore structure, etc.) can be prepared by altering the activation conditions (e.g., temperature, time, etc.) described above.

Activated carbon prepared was jet milled using a Jet Pulverizer Micron Master 2 inch diameter jet mill and at the manufacturing scale, a 15 inch diameter jet mill was used. The average particle size after jet milling was about 4 to 7 microns.

Chemical species on the surface of the activated carbon was removed with a heat treatment process by heating the carbon in an elevator furnace under nitrogen gas for 1 hour at 900° C. The pH was measured on the treated carbon and was 7.9 indicating a lack of oxygen containing surface functional groups. Properties of various carbons prepared by the above method are summarized in Table 18.

Example 14

Alternative Preparation of a Carbon Material

A carbon material ("Carbon 13") having increased energy density with balanced power performance was prepared according to the following description. A polymer gel was prepared by polymerization of resorcinol and formaldehyde (0.5:1) in a water/acetic acid solvent (80:20) in the presence of ammonium acetate catalyst. The resultant polymer to solvent ratio was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel with a rock crusher through a screen with ¾ inch sized holes.

Polymer gel particles were prepared was pyrolyzed by passage into a furnace at 625° C. with a nitrogen gas flow of 400 L/h.

The surface area of the pyrolyzed dried polymer gel was examined by nitrogen surface analysis using a surface area and porosity analyzer. The measured specific surface area using the standard BET approach was 585 m²/g, the total pore volume was 0.28 cc/g. Carbon materials comprising different properties (e.g., surface area, pore structure, etc.) can be prepared by altering the pyrolysis conditions (e.g., temperature, time, etc.) described above.

Pyrolyzed carbon material prepared according to above was activated in a 4" Fluidized Bed Reactor at 900° C. under a $CO_2$ for approximately 15 hours.

The surface area of the activated carbon was examined by nitrogen surface analysis using a surface area and porosity analyzer. The measured specific surface area using the BET approach was 2529 m²/g, the total pore volume was 1.15 cc/g and the tap density was 0.36 g/cc.

From the DFT cumulative volume plot for the activated carbon material, it was determined that the 68% of the pore volume resides in micropores and 32% of the pore volume resides in mesopores. Carbon materials comprising different properties (e.g., surface area, pore structure, etc.) can be prepared by altering the activation conditions (e.g., temperature, time, etc.) described above.

Activated carbon prepared was jet milled using a Jet Pulverizer Micron Master 2 inch diameter jet mill. The average particle size after jet milling was about 4 to 7 microns.

Example 15

Properties of Various Carbon Materials

Carbon materials having various properties can be prepared according to the general procedures described above. Table 17 summarizes the properties of carbon materials prepared according to the noted examples.

TABLE 17

Physiochemical Characteristics of Carbons Prepared According to Examples 12-14

| Example | SSA ($m^2/g$) | Total Pore Volume (cc/g) | Tap Density (g/cc) | Ratio $N_2$ adsorbed (P/Po)95/(P/Po)5 | PV meso/ PV total (%) | Purity |
|---|---|---|---|---|---|---|
| Ex. 12 | 600-800 | 0.5-0.9 | 0.35-0.45 | 2.0-3.0 | 40-60% | <200 ppm impurities Ash: 0.001-0.03% |
| Ex. 1-3 | 1550-2100 | 1.2-1.6 | 0.25-0.35 | 1.8-2.5 | 52-60% | <200 ppm impurities Ash: 0.001-0.03% |
| Ex. 1-3 | 2100-2800 | 1.5-2.7 | 0.19-0.28 | 2.0-2.5 | 52-60% | <200 ppm impurities Ash: 0.001-0.03% |
| Ex. 13 | 1800-2200 | 0.8-1.2 | 0.30-0.45 | 1.2-1.6 | 20-50% | <200 ppm impurities Ash: 0.001-0.03% |
| Ex. 14 | 1800-2600 | 0.7-1.3 | 0.25-0.45 | 1.2-1.8 | 20-50% | <200 ppm impurities Ash: 0.001-0.03% |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A carbon material comprising a pore structure, the pore structure comprising micropores, mesopores and a total pore volume, wherein from 80% to 90% of the total pore volume resides in micropores, from 10% to 20% of the total pore volume resides in mesopores, provided that less than 10% of the total pore volume resides in pores greater than 20 nm.

2. The carbon material of claim 1, wherein less than 5% of the total pore volume resides in pores greater than 20 nm.

3. The carbon material of claim 1, wherein the carbon material comprises a total impurity content of less than 500 ppm of elements having atomic numbers ranging from 11 to 92 as measured by proton induced x-ray emission.

4. The carbon material of claim 1, wherein the carbon material comprises a total impurity content of less than 100 ppm of elements having atomic numbers ranging from 11 to 92 as measured by proton induced x-ray emission.

5. The carbon material of claim 1, wherein the carbon material comprises a total impurity content of less than 50 ppm of elements having atomic numbers ranging from 11 to 92 as measured by proton induced x-ray emission.

6. The carbon material of claim 1, wherein the ash content of the carbon material is less than 0.03% as calculated from proton induced x-ray emission data.

7. The carbon material of claim 1, wherein the ash content of the carbon material is less than 0.01% as calculated from proton induced x-ray emission data.

8. The carbon material of claim 1, wherein the ash content of the carbon material is less than 0.001% as calculated from proton induced x-ray emission data.

9. The carbon material of claim 1, wherein the carbon material comprises at least 95% carbon by weight as measured by combustion analysis and proton induced x-ray emission.

10. The carbon material of claim 1, wherein the carbon material comprises less than 10 ppm iron as measured by proton induced x-ray emission.

11. The carbon material of claim 1, wherein the carbon material comprises less than 3 ppm nickel as measured by proton induced x-ray emission.

12. The carbon material of claim 1, wherein the carbon material comprises less than 30 ppm sulfur as measured by proton induced x-ray emission.

13. The carbon material of claim 1, wherein the carbon material comprises less than 1 ppm chromium as measured by proton induced x-ray emission.

14. The carbon material of claim 1, wherein the carbon material comprises less than 1 ppm copper as measured by proton induced x-ray emission.

15. The carbon material of claim 1, wherein the carbon material comprises less than 1 ppm zinc as measured by proton induced x-ray emission.

16. The carbon material of claim 1, wherein the carbon material comprises less than 100 ppm sodium, less than 100 ppm silicon, less than 10 ppm sulfur, less than 25 ppm calcium, less than 10 ppm iron, less than 2 ppm nickel, less than 1 ppm copper, less than 1 ppm chromium, less than 50 ppm magnesium, less than 10 ppm aluminum, less than 25 ppm phosphorous, less than 5 ppm chlorine, less than 25 ppm potassium, less than 2 ppm titanium, less than 2 ppm manganese, less than 0.5 ppm cobalt and less than 5 ppm zinc as measured by proton induced x-ray emission, and wherein all other elements having atomic numbers ranging from 11 to 92 are undetected by proton induced x-ray emission.

17. The carbon material of claim 1, wherein the carbon material comprises less than 50 ppm sodium, less than 50 ppm silicon, less than 30 ppm sulfur, less than 10 ppm calcium, less than 10 ppm iron, less than 1 ppm nickel, less than 1 ppm copper, less than 1 ppm chromium and less than 1 ppm zinc as measured by proton induced x-ray emission.

18. The carbon material of claim 1, wherein the carbon material comprises less than 3.0% oxygen, less than 0.1% nitrogen and less than 0.5% hydrogen as determined by combustion analysis.

19. The carbon material of claim 1, wherein the carbon material comprises less than 1.0% oxygen as determined by combustion analysis.

20. The carbon material of claim 1, wherein the carbon material comprises a pyrolyzed polymer cryogel.

21. The carbon material of claim 1, wherein the carbon material comprises an activated polymer cryogel.

22. The carbon material of claim 1, wherein the carbon material comprises a BET specific surface area of at least 500 $m^2/g$.

23. The carbon material of claim 22, wherein the carbon material comprises a total impurity content of less than 500 ppm of elements having atomic numbers ranging from 11 to 92 as measured by proton induced x-ray emission.

24. The carbon material of claim 1, wherein the carbon material comprises a BET specific surface area of at least 1500 $m^2/g$.

25. The carbon material of claim 24, wherein the carbon material comprises a total impurity content of less than 500 ppm of elements having atomic numbers ranging from 11 to 92 as measured by proton induced x-ray emission.

26. The carbon material of claim 1, wherein the carbon material comprises a BET specific surface area of at least 2000 $m^2/g$.

27. The carbon material of claim 1, wherein the carbon material comprises a pore volume of at least 0.60 cc/g.

28. The carbon material of claim 27, wherein the carbon material comprises a total impurity content of less than 500 ppm of elements having atomic numbers ranging from 11 to 92 as measured by proton induced x-ray emission.

29. The carbon material of claim 1, wherein the carbon material comprises a pore volume of at least 1.00 cc/g.

30. The carbon material of claim 29, wherein the carbon material comprises a total impurity content of less than 500 ppm of elements having atomic numbers ranging from 11 to 92 as measured by proton induced x-ray emission.

31. The carbon material of claim 1, wherein the carbon material comprises a pore volume of at least 1.50 cc/g.

32. The carbon material of claim 1, wherein the carbon material comprises a pore volume of at least 2.00 cc/g.

33. The carbon material of claim 1, wherein the carbon material comprises a total impurity content of less than 200 ppm of elements having atomic numbers ranging from 11 to 92 as measured by proton induced x-ray emission.

34. The carbon material of claim 1, wherein less than 2.5% of the total pore volume resides in pores greater than 20 nm.

35. The carbon material of claim 1, wherein less than 1% of the total pore volume resides in pores greater than 20 nm.

* * * * *